(12) United States Patent
Wolf et al.

(10) Patent No.: US 11,369,948 B2
(45) Date of Patent: Jun. 28, 2022

(54) METHOD OF CATALYST PREPARATION BY PRESSURE DILUTION

(71) Applicant: UNIVERSITY OF NOTRE DAME DU LAC, Notre Dame, IN (US)

(72) Inventors: Eduardo Wolf, Notre Dame, IN (US); Vardan Danghyan, Notre Dame, IN (US)

(73) Assignee: UNIVERSITY OF NOTRE DAME DU LAC, Notre Dame, IN (US)

( * ) Notice: Subject to any disclaimer, the term of this patent is extended or adjusted under 35 U.S.C. 154(b) by 90 days.

(21) Appl. No.: 17/047,382

(22) PCT Filed: Jun. 4, 2018

(86) PCT No.: PCT/US2018/035892
§ 371 (c)(1),
(2) Date: Oct. 13, 2020

(87) PCT Pub. No.: WO2019/236055
PCT Pub. Date: Dec. 12, 2019

(65) Prior Publication Data
US 2021/0114000 A1    Apr. 22, 2021

(51) Int. Cl.
*B01J 23/75*    (2006.01)
*B01J 23/755*    (2006.01)
(Continued)

(52) U.S. Cl.
CPC ............ *B01J 23/755* (2013.01); *B01J 21/08* (2013.01); *B01J 35/026* (2013.01);
(Continued)

(58) Field of Classification Search
CPC ...... B01J 23/745; B01J 23/755; B01J 23/892; B01J 21/08; B01J 35/002; B01J 35/023; B01J 35/026; B01J 35/1019; B01J 37/0027; B01J 37/0063; B01J 37/0213; B01J 37/0236; B01J 37/16; C01B 3/40;
(Continued)

(56) References Cited

U.S. PATENT DOCUMENTS 7,572,423 B2    8/2009 Kutsovsky
7,910,081 B2    3/2011 Liu et al.
(Continued)

OTHER PUBLICATIONS

Ali et al., "Catalytic evaluation of nickel nanoparticles in methane steam reforming", Int. J. Hydrogen Energy, vol. 41, 2016, pp. 22876-22885.

(Continued)

*Primary Examiner* — Brian A McCaig
(74) *Attorney, Agent, or Firm* — Michael Best & Friedrich LLP

(57) ABSTRACT

Described is a method for the preparation of a reforming catalyst. The method comprises: (a) depositing a metal precursor on a porous support by wet impregnation, wherein the porous support is selected from the group consisting of a fumed silica, a fumed metal oxide, and combinations thereof; (b) drying the porous support after depositing the metal precursor to form a powder; (c) adding additional porous support to the powder to form a diluted powder; and (d) pressing the diluted powder to form pellets.

15 Claims, 22 Drawing Sheets

(51) Int. Cl.

| | |
|---|---|
| B01J 21/08 | (2006.01) |
| B01J 35/02 | (2006.01) |
| B01J 37/00 | (2006.01) |
| B01J 37/02 | (2006.01) |
| B01J 37/16 | (2006.01) |
| C01B 3/40 | (2006.01) |

(52) U.S. Cl.
CPC ....... *B01J 37/0063* (2013.01); *B01J 37/0213* (2013.01); *B01J 37/0236* (2013.01); *B01J 37/16* (2013.01); *C01B 3/40* (2013.01); *C01B 2203/0238* (2013.01); *C01B 2203/1058* (2013.01); *C01B 2203/1082* (2013.01)

(58) Field of Classification Search
CPC .... C01B 2203/0238; C01B 2203/1058; C01B 2203/1082
See application file for complete search history.

(56) References Cited

U.S. PATENT DOCUMENTS

| 8,038,971 | B2 | 10/2011 | Davis et al. | |
|---|---|---|---|---|
| 8,087,450 | B2 | 1/2012 | Nycz et al. | |
| 8,729,158 | B2 | 5/2014 | Davis et al. | |
| 2005/0226809 | A1* | 10/2005 | Gudlavalleti | C01B 3/503 123/3 |
| 2016/0074844 | A1 | 3/2016 | Freer et al. | |

OTHER PUBLICATIONS

Baker, "Catalytic Growth of Carbon Filaments", Carbon, vol. 27, 1989, pp. 315-323.
Banerjee et al., "In Situ Synthesis and Nanoscale Evolution of Model Supported Metal Catalysts: Ni on Silica", J. Phys. Chem. C, vol. 116, 2012, pp. 11486-11495.
Barroso-Quirogo et al., "Catalytic Activity and effect of modifers on Ni-based catalysts for the dry reforming of methane", Int. J. Hydrogen Energy, vol. 35, 2010, pp. 6052-6056.
Bengaard et al., "Steam Reforming and Graphite Formation on Ni-Catalysts", J. Catal., vol. 209, 2002, pp. 365-384.
Borowiecki, "Nickel Catalysts for Steam Reforming of Hydrocarbons; Size of Crystallites and Resistance to Coking", Appl. Catal., vol. 4, 1982, pp. 223-231.
Bradford et al., "Catalytic reforming of methane with carbon dioxide over nickel catalysts I. Catalyst characterization and activity", Appl. Catal. A, vol. 142, 1996, pp. 73-96.
Bradford et al., "Catalytic refomring of methan with carbon dioxide over nickel catalsts II. Reaction kinetics", Appl. Catal. A, vol. 142, 1996, pp. 97-122.
Bradford et al., "CO2 reforming of CH4", Catal. Rev, vol. 41, No. 1, 1999, pp. 1-42.
Brockner et al, "Thermal decomposition of nickel nitrate hexahydrate, Ni(NO3)2•6H2O, in comparison to Co(NO3)2•6H2O and Ca(NO3)2•4H2O", Thermochim Acta, vol. 456, 2007, pp. 64-68.
Bychkov et al., "Carbonization of nickel catalysts and its effect on methane dry reforming", Appl. Catal. A., vol. 453, 2013, pp. 71-79.
Castro-Luna et al., "Carbon dioxide reforming of methane over a metal modified Ni—Al2—O3 catalyst", Appl. Catal. A, vol. 343, 2008, pp. 10-15.
Chen et al., "Deactivation during carbon dioxide reforming of methane over Ni catalyst: microkinetic analysis", Chem. Eng. Sci., vol. 56, 2001, pp. 1371-1379.
Chen et al., "Synthesis of carbon nanfibers: effects of Ni crystal size during methane decomposition", J. Catal., vol. 229, 2005, pp. 82-96.
Chen et al., "Effects of prepartion methods on properties of Ni/CeO2—Al2—O3 catalysts for methane reforming with carbon dioxide", J. Mol. Catal. A, vol. 235, 2005, pp. 302-310.
Choudhary et al., "Catalysts for combustion of methane and lower alkanes", Appl. Catal. A, vol. 234, 2002, p. 1-23.
Danghyan et al., "Pressure dilution, a new method to prepare a stable Ni/fumed silica catalyst for the dry reforming of methane", Applied Catalysts B: Environmental, vol. 234, 2018, pp. 178-186.
Dry, "The Fischer-Tropsch process: 1950-2000", Catal. Today., vol. 71, 2002, pp. 227-241.
Gohier et al., "Carbon nanotube growth mechanism switches from tip- to base-growth with decreasing catalyst particle size", Carbon, vol. 46, 2008, pp. 1331-1338.
Guo et al., "Dry reforming of methane over nickel catalysts supported on magnesium aluminate spinels", Appl. Catal. A, vol. 273, 2004, pp. 75-82.
Han et al., "Uncoupling the size and support effects of Ni catalysts for dry reforming of methane", Appl. Catal. B, vol. 203, 2017, pp. 625-632.
Howarth et al., "Methane and the greenhouse-gas footprint of natural gas from shale formations", Climatic Change, vol. 106, 2011, pp. 679-690.
Kroll et al., "Methane reforming Reaction with Carbon Dioxide Over Ni/SiO2 Catalyst", J. Catal., vol. 161, 1996, pp. 409-422.
Kroll et al., "Methane Reforming Reaction with Carbon Diozide Over Ni/SiO2 Catalysts II. A Mechanistic Study", J. Catal., vol. 164, 1997, pp. 387-398.
Kumar et al., "Impregnated layer combustion synthesis method for prepartion of multicomponent catalysts for the production of hydrogen from oxidative reforming of methanol", Appl. Catal. A, vol. 372, 2010, pp. 175-183.
Kumar et al., "Combustion synthesis of Ni, Fe, and Cu multi-component catalysts for hydrogen production from ethanol reforming", Appl. Catal. A, vol. 401, 2011, pp. 20-28.
Laosiripojana et al., "Catalytic dry reforming of methane over high surface area ceria", Appl. Catal. B, vol. 60, 2005, pp. 107-116.
Lavoie, "Review on dry reforming of methane, a potentially more environmentally-friendly approach to the increasing natural gas exploitation", Frontiers in Chem, vol. 2, Article 81, 2014, 17 pages.
Li et al., "Design of highly stable and selective core/yolk-shell nanocatalsts—A review", Appl. Catal. B, vol. 188, 2016, pp. 324-341.
Li et al., "Yolk-Satellite-Shell Structured Ni-Yolk@Ni@SiO2 Nanocomposite: Superb Catalyst toward Methane CO2 Reforming Reaction", ACS Catal, vol. 4, 2014, pp. 1526-1536.
Li et al., "Methane decomposition to COx-free hydrogen and nano-carbon material on group 8-10 base metal catalysts: A Review", Catal. Today, vol. 162, 2011, pp. 1-48.
Liu et al., "Progresses in the Prepartion of Coke Resistant Ni-based Catalyst for Steam and CO2 Reforming of Methane", ChemCatCem, vol. 3, 2011, pp. 529-541.
Lovell et al., "Enhancing Ni—SiO2 catalysts for the carbon dioxide reforming of methane: Reduction-oxidation-reduction pre-treatment", Appl. Catal. B, vol. 199, 2016, pp. 155-165.
Majewski et al., "Tri-reforming of methane over Ni@SiO2 catalyst", International Journal of Hydrogen Energy, vol. 39, 2014, pp. 12578-12585.
Manukyan et al., "Solution Combustion Synthesis of Nano-Crystalline Metallic Materials: Mechanistic Studies", J. Phys. Chem., C, vol. 117, 2013, pp. 24417-24427.
Montes et al., "Influence of Metal-Support Interactions on the Stability of Ni/SiO2 Catalysts during Cyclic Oxidation-Reduction Treatments", J. Chem. Soc. Faraday Trans, vol. 80, 1984, pp. 3209-3220.
Mortensen et al., "Industrial scale experience on steam reforming of CO2-rich gas", Appl. Catal. A, vol. 495, 2015, pp. 141-151.
Newnham et al., "Highly stable and active Ni-mesoporous alumina catalysts for dry reforming of methane", Hydrogen Energy, vol. 37, 2012, pp. 1454-1464.
Ozkara-Aydinoglu et al., "The effect of impregnation strategy on methane dry reforming activity of Ce promoted Pt/ZrO2", Hydrogen Energy, vol. 34, 2009, pp. 9711-9722.
Pakhare et al., "A review of dry (CO2) reforming of methane over noble metal catalysts" Chem Soc Rev, vol. 43, No. 22, 2014, pp. 7813-7837.
Paulik et al., "Investigation of the phase diagram for the system Ni(NO3)2—H2O and examination of the decomposition of Ni(NO3)2•6H2O", Thermochim Acta, vol. 121, 1987, pp. 137-149.

(56) References Cited

OTHER PUBLICATIONS

Rostrup-Nielson et al., "Hydrogen and Synthesis Gas by Steam- and CO2 Reforming", Adv. Catal., vol. 47, 2002, pp. 65-139.
Schaefer et al., "Growth and Structure of Combustion Aerosols", Aerosol Sci. Technol., vol. 12, 1990, pp. 876-890.
Shang et al., "Highly active and stable alumina supported nickel nanoparticle catalysts for dry reforming of methane", Appl. Catal. B, vol. 201, 2017, pp. 302-309.
Takenaka et al., "Ni/ZiO2 Catalyst effective for methane decomposition into hydrogen and carbon nanofiber", J. Catal., vol. 217, 2003, pp. 79-87.
Usman et al., "Dry reforming of methane: Influence of process parameters—A review", Renew. Sust. Energ. Rev., vol. 45, 2015, pp. 710-744.
Wang et al., "CO2 reforming of metahne on Ni catalysts: Effects of the support phase and prepartion technique", Appl. Catal. B, vol. 16, 1998, pp. 269-277.
Wang et al., "Carbon Dioxide Reforming of Methane To Produce Synthesis Gas over Metal-Supported Catalysts: State of the Art", Energ. Fuel., vol. 10, No. 4, 1996, pp. 896-904.
Zhang et al., "Coke-resistance Ni@SiO2 catalyst for dry reforming of methane", Appl. Catal. B, vol. 176-177, 2015, pp. 513-521.
International Search Report and Written Opinion for Application No. PCT/US18/35892 dated Sep. 12, 2018 (8 pages).
International Preliminary Report on Patentability for Application No. PCT/US2018/035892 dated Dec. 8, 2020 (5 pages).

\* cited by examiner

METHOD OF CATALYST PREPARATION BY PRESSURE DILUTION

TECHNICAL FIELD

The present disclosure relates to methods for the production of catalysts. The catalysts may be useful for dry reformation of methane.

BACKGROUND

The reaction of $CO_2$ with methane or dry reforming of methane (DRM) produces syngas with a $H_2/CO$ ratio close to 1, suitable for further methanol and Fischer-Tropsch synthesis. DRM is environmentally more advantageous than other syngas production reactions since it utilizes methane and carbon dioxide, two major greenhouse gases. In recent decades, many metal catalysts supported on various oxides with different compositions and structures have been investigated. However, few of them can be used in industry either for being too expensive, difficult to prepare, and/or having low activity.

Ni supported catalysts have been intensively investigated because they are price competitive, easy to prepare, exhibit good conversion rates, and are actually used in industry for steam reforming of methane. One of the main limitations of using the DRM reaction on Ni catalysts is its deactivation due to the carbon formation. The type and structure of the carbon formed (carbidic, amorphous, polymeric, nanotubes, graphene type, shell-type, graphitic, filamentous), the amount deposited, and its effect on the catalyst activity may be different for each catalyst and depends on the metal support interactions, catalyst structure, preparation method, reaction conditions, etc. On silica ($SiO_2$) supported Ni catalysts, due to the weak metal-support interaction, Ni crystallites have high degree of reduction that results in high initial activity, but also in favorable conditions for carbon formation, eventually resulting in catalyst deactivation. As such, methods for producing catalysts with increased activity and stability are needed.

SUMMARY

In one aspect, disclosed is a method for the preparation of a reforming catalyst. The method comprises: (a) depositing a metal precursor on a porous support by wet impregnation, wherein the porous support is selected from the group consisting of a fumed silica, a fumed metal oxide, and combinations thereof; (b) drying the porous support after depositing the metal precursor to form a powder; (c) adding additional porous support to the powder to form a diluted powder; and (d) pressing the diluted powder to form pellets.

Other aspects of the disclosure will become apparent by consideration of the detailed description and accompanying drawings.

BRIEF DESCRIPTIONS OF THE DRAWINGS

FIG. 1 is a graph showing $CH_4$ and $CO_2$ conversions vs TOS for reduced-only and calcined-reduced samples at 600° C. along with the formed carbon amount at different TOS for calcined-reduced catalyst.

FIG. 2A and FIG. 2B are graphs showing TGA-DSC results for impregnated powders. FIG. 2A is a graph showing $N_2$/air flow. FIG. 2B is a graph showing 5% $H_2$ flow.

FIGS. 3A-C are SEM images of deactivated catalysts. FIG. 3A-B show entanglement of carbon nanotubes. FIG. 3C shows a cross-section of a CT clump.

Figure 6A:
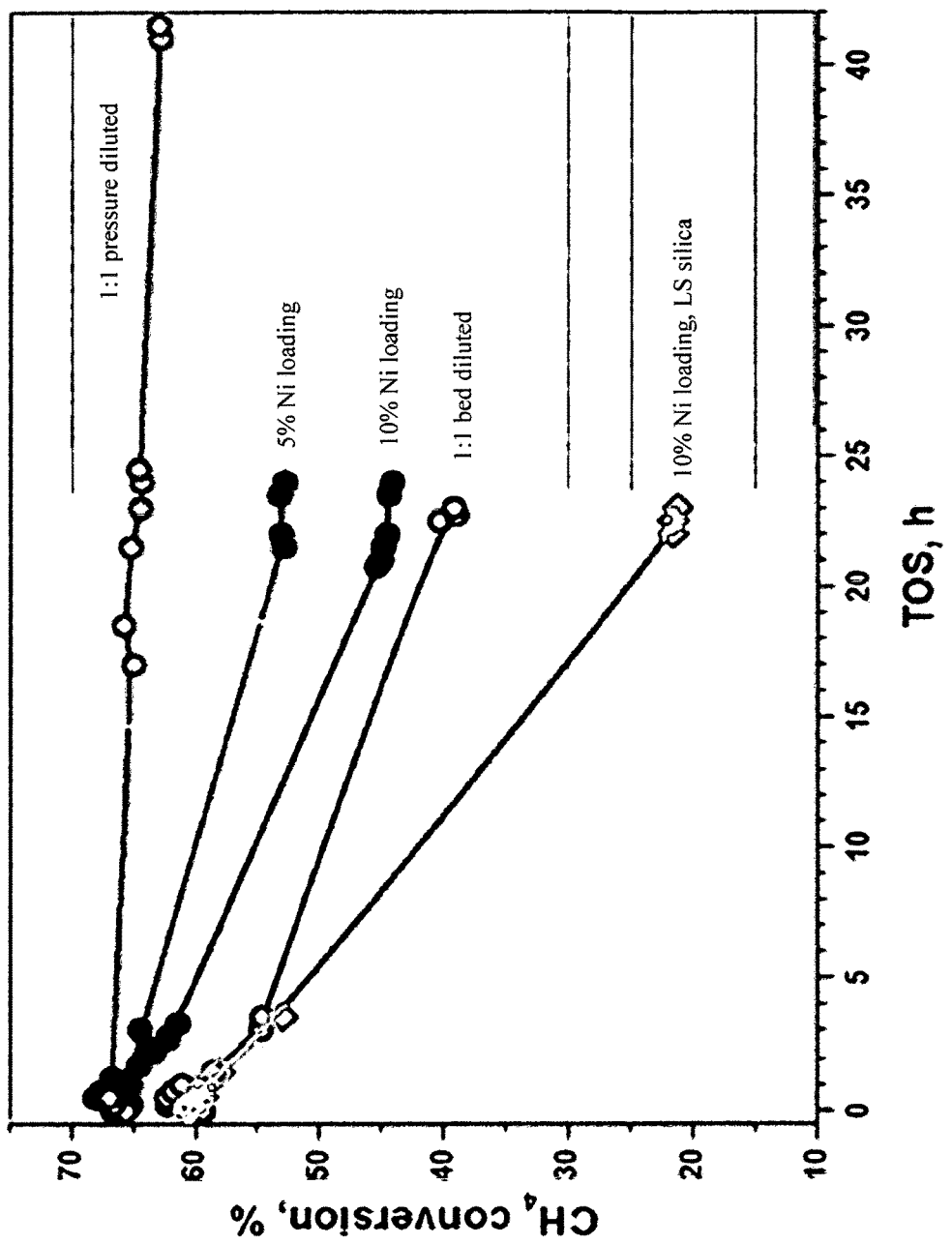
Figure 6C:
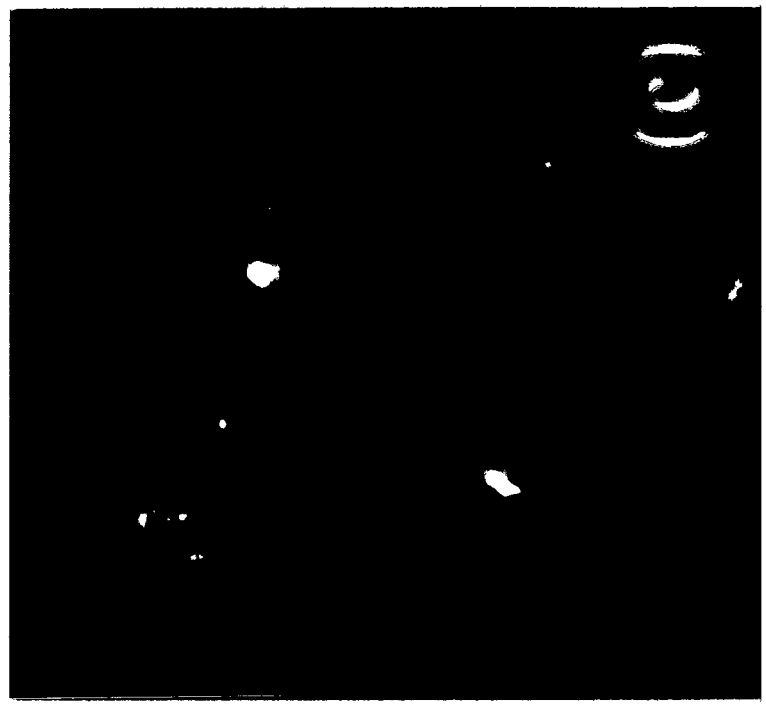
Figure 6B:
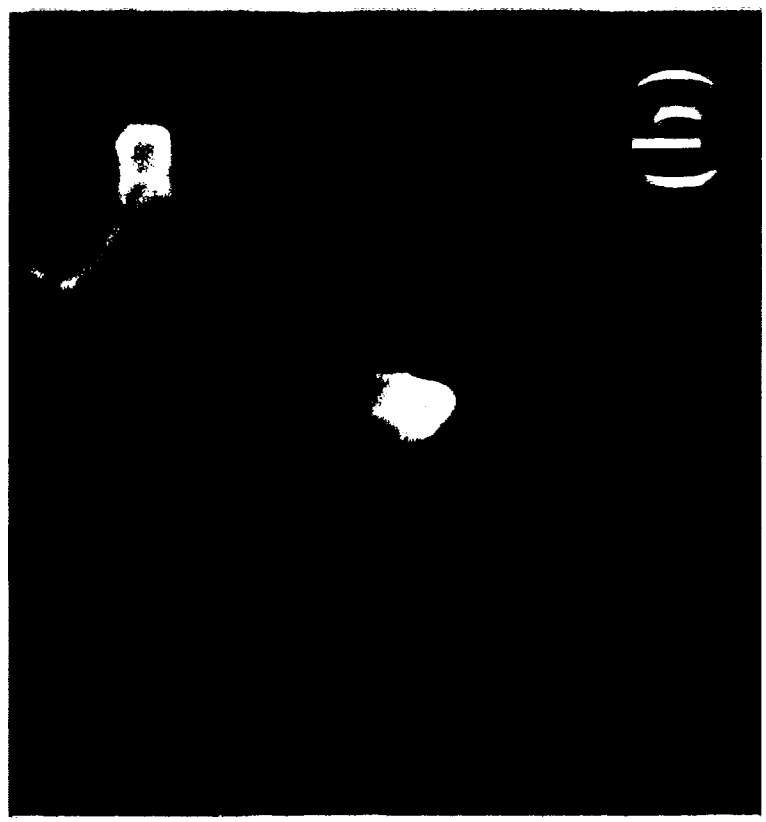
Figure 6E:
Figure 6D:
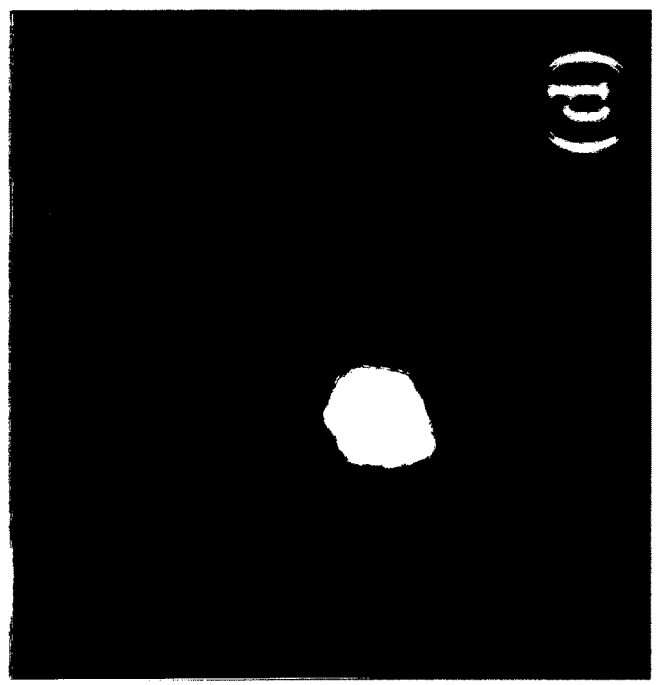

FIG. 6A is a graph showing methane conversion during DRM at 600° C. for 5 and 10% Ni loaded, p-diluted and bed diluted fumed $SiO_2$ and 10% Ni loaded low surface area (LS) $SiO_2$ catalysts. FIGS. 6B-E are microscopy images of the p-diluted catalyst after 40 h TOS.

Figure 7A:
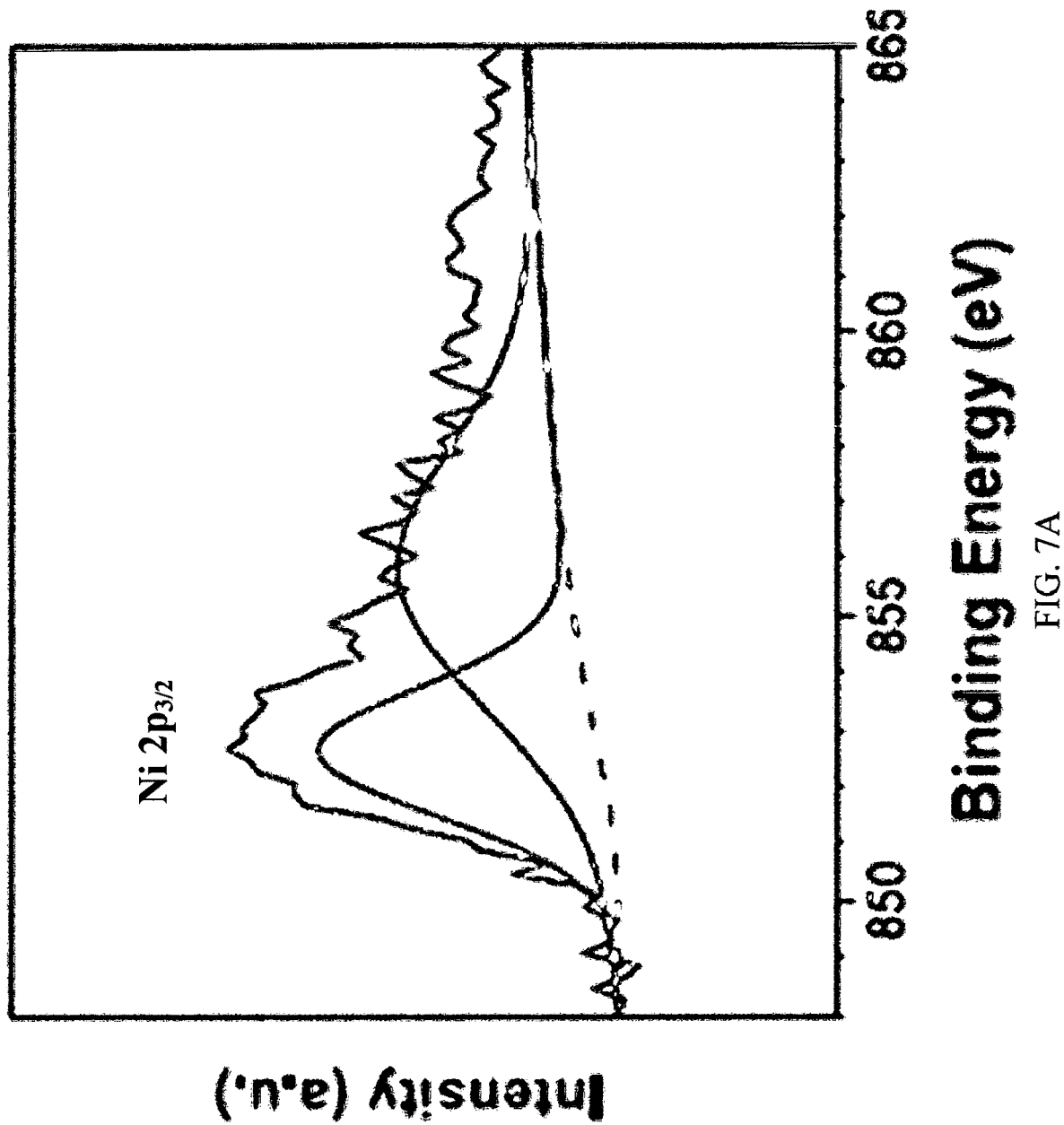
Figure 7B:
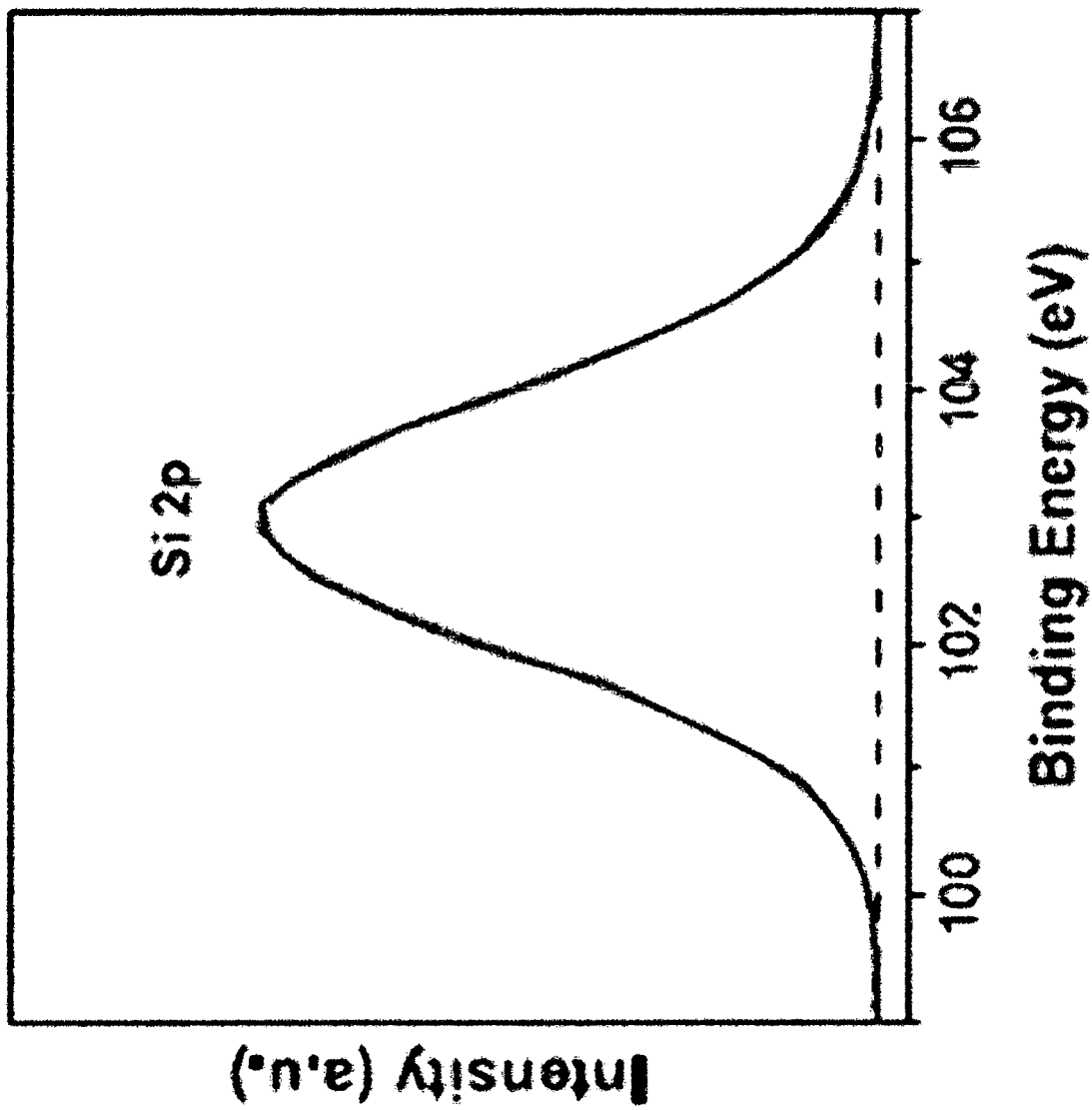
Figure 7C:
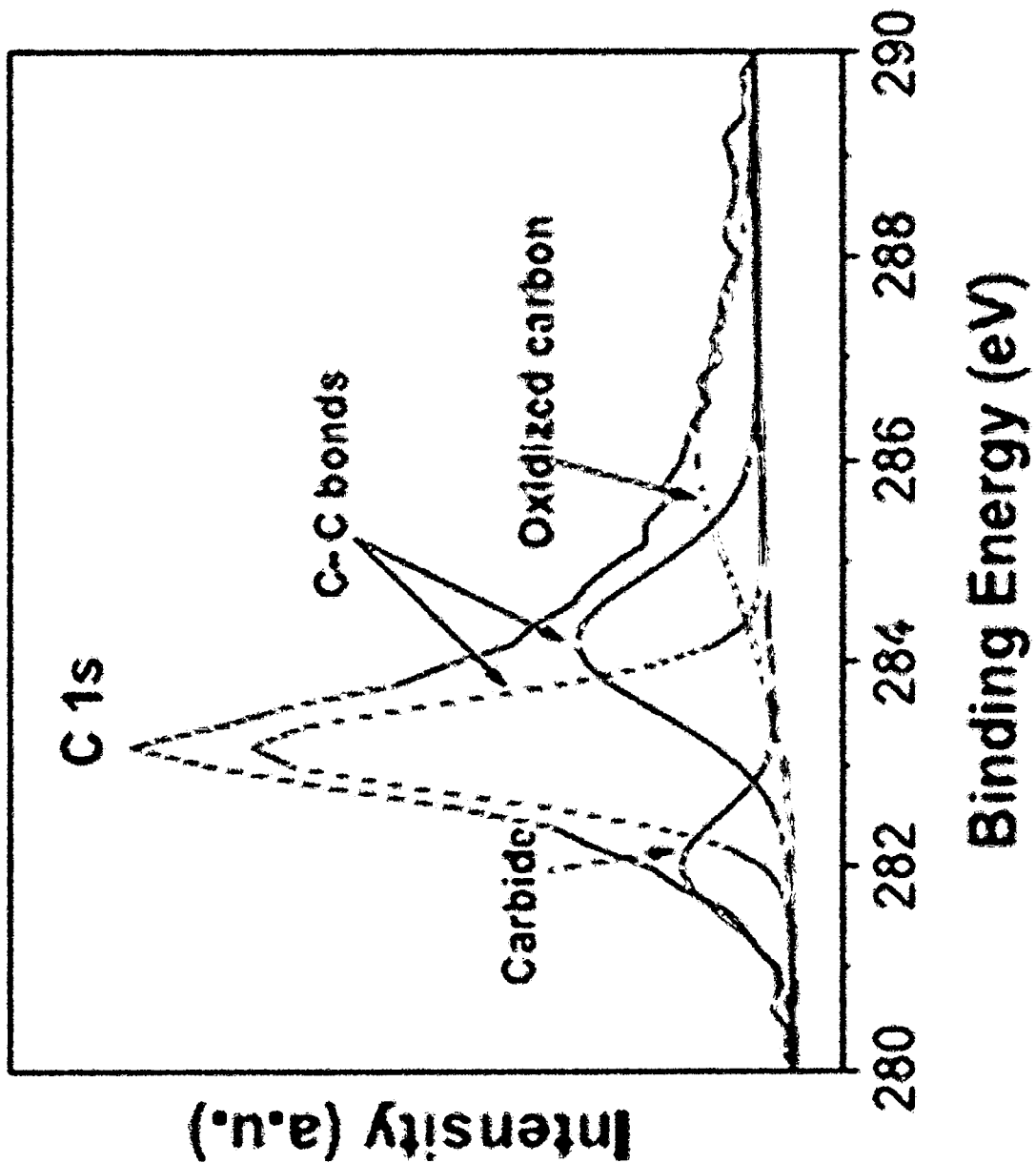

FIG. 7A, FIG. 7B and FIG. 7C are graphs showing XPS results of catalysts. Fresh catalysts are shown in FIG. 7A-B. Deactivated catalysts are shown in FIG. 7C.

Figure 8:
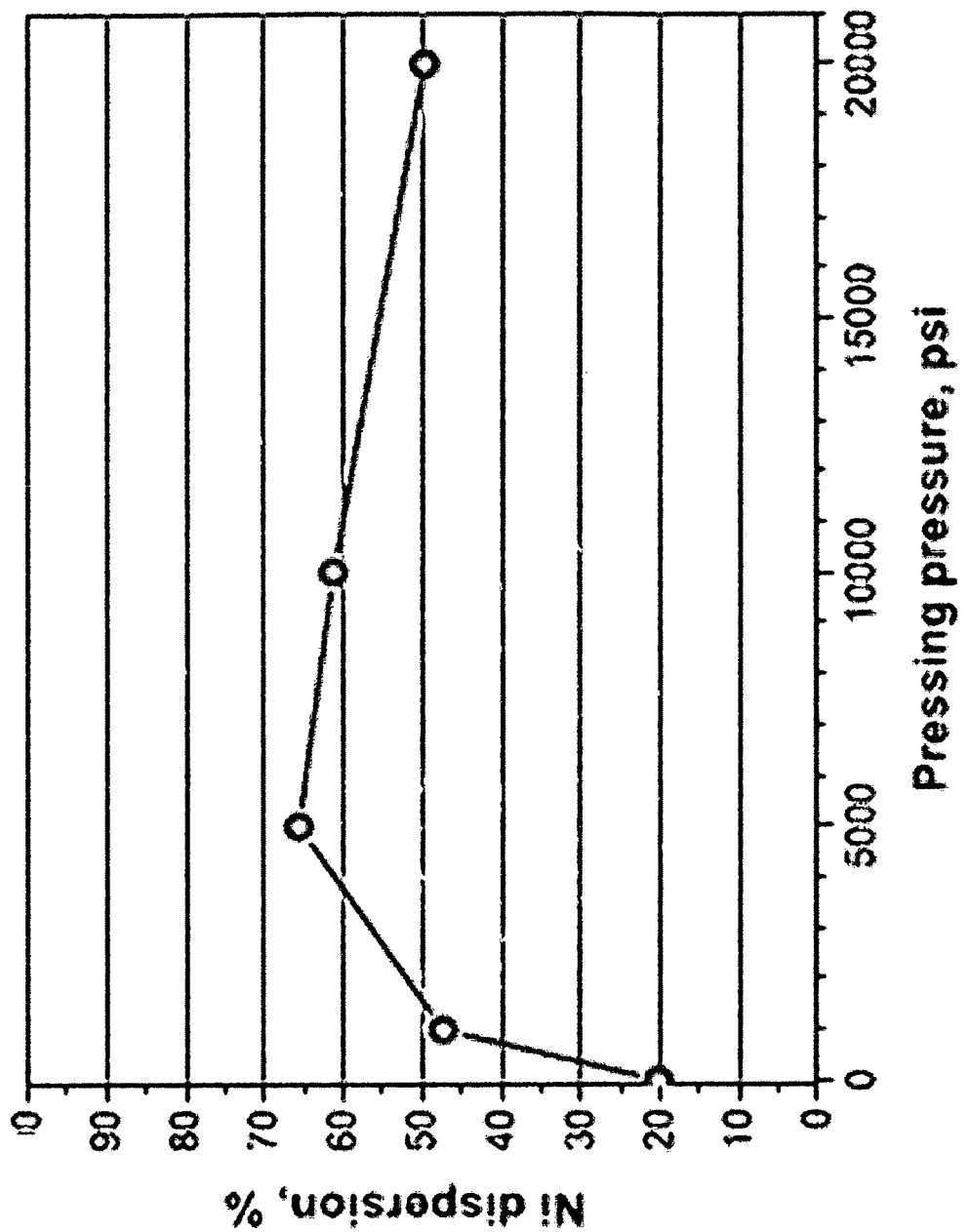

FIG. 8 is a graph showing the effect of pressing pressure on the final Ni dispersion during preparation of p-diluted catalysts.

FIGS. 9A-D are STEM images along with contrasted & thresholded images of regular (FIG. 9A, FIG. 9C) and p-diluted (FIG. 9B, FIG. 9D) fresh catalysts and calculated Ni crystallite size distribution.

Figure 10:
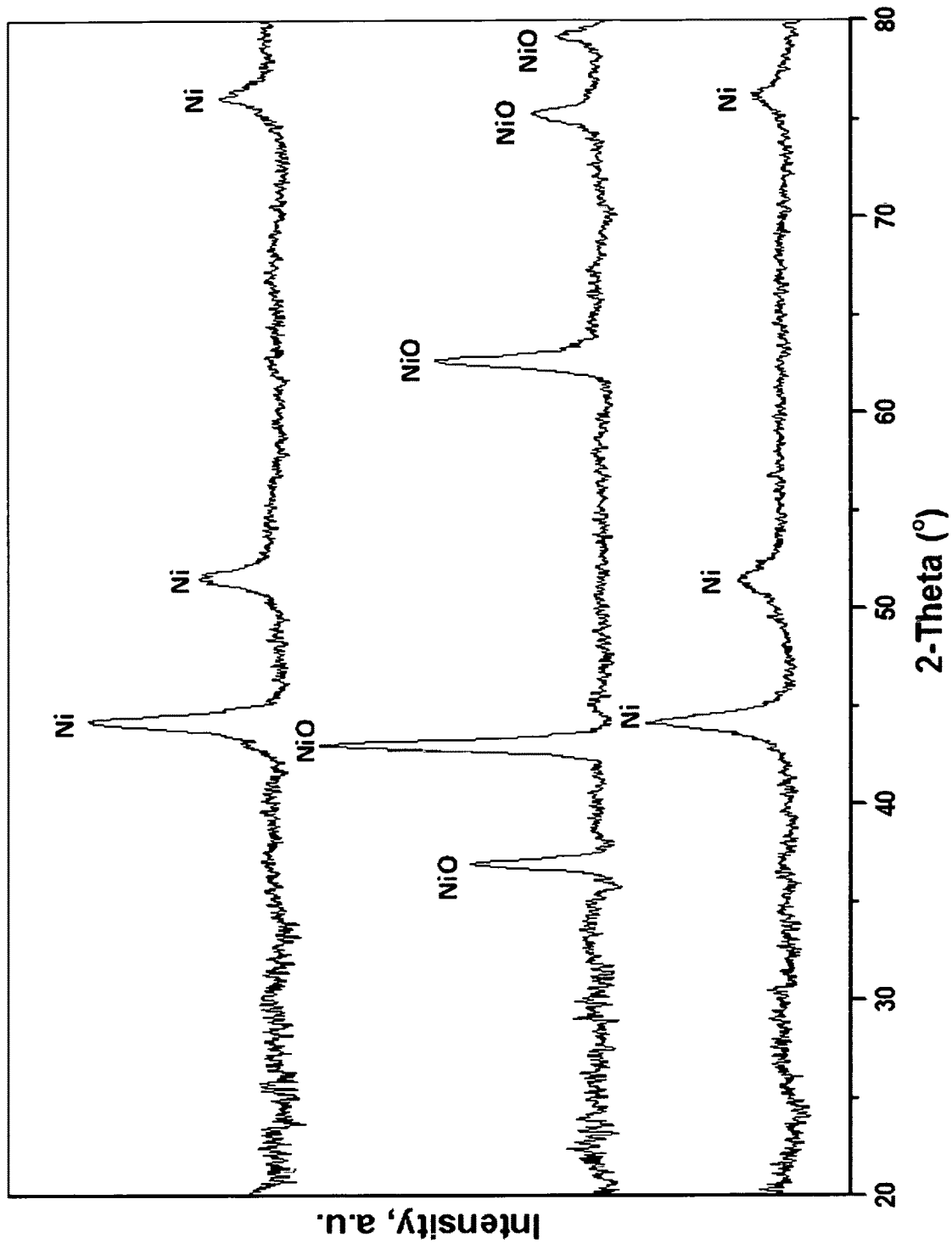

FIG. 10 is a series of XRD patterns of fresh catalysts with different pretreatments. Bottom line shows reduced-only, middle line shows calcined, top line shows calcined-reduced.

Figure 11A:
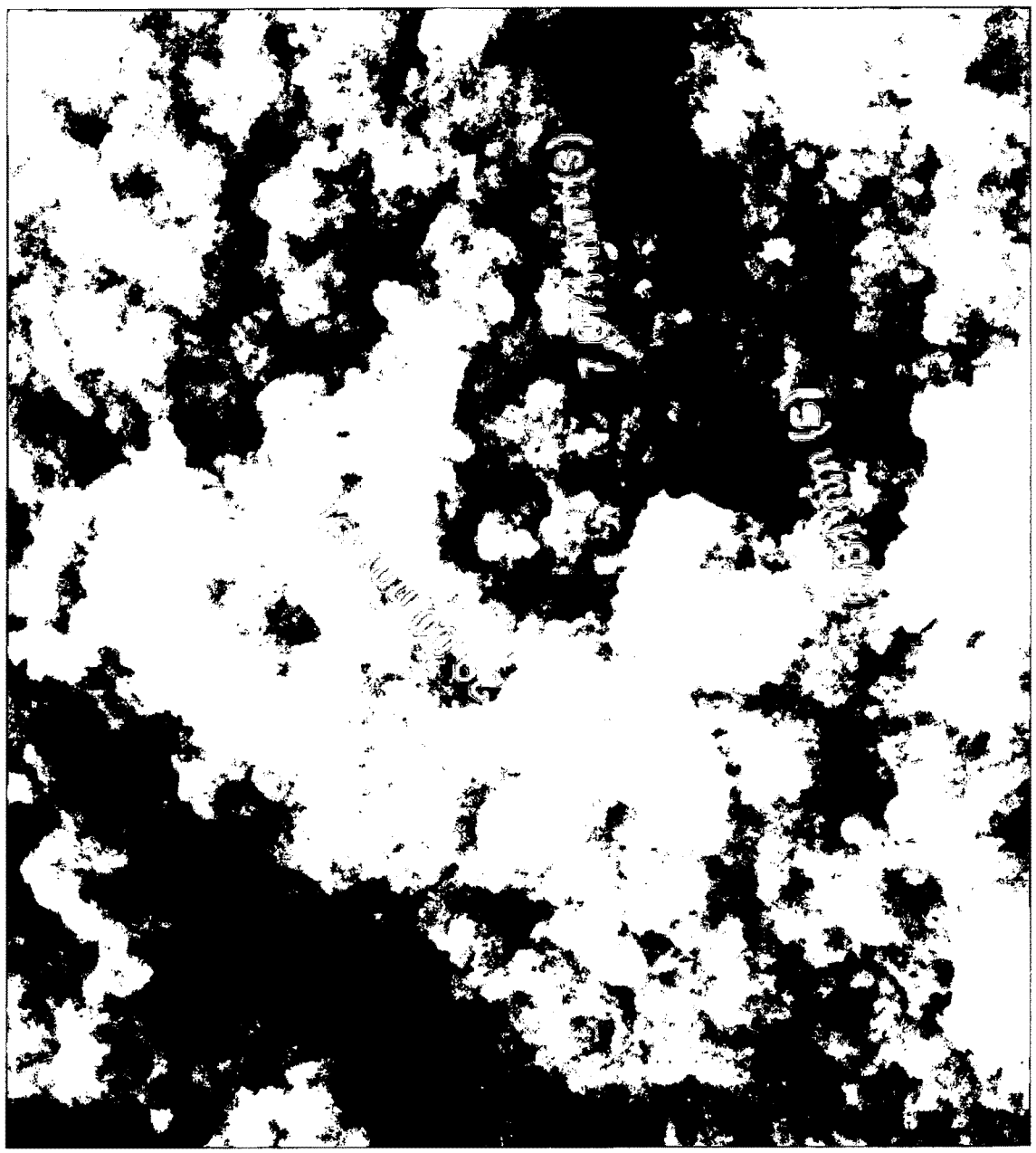
Figure 11B:
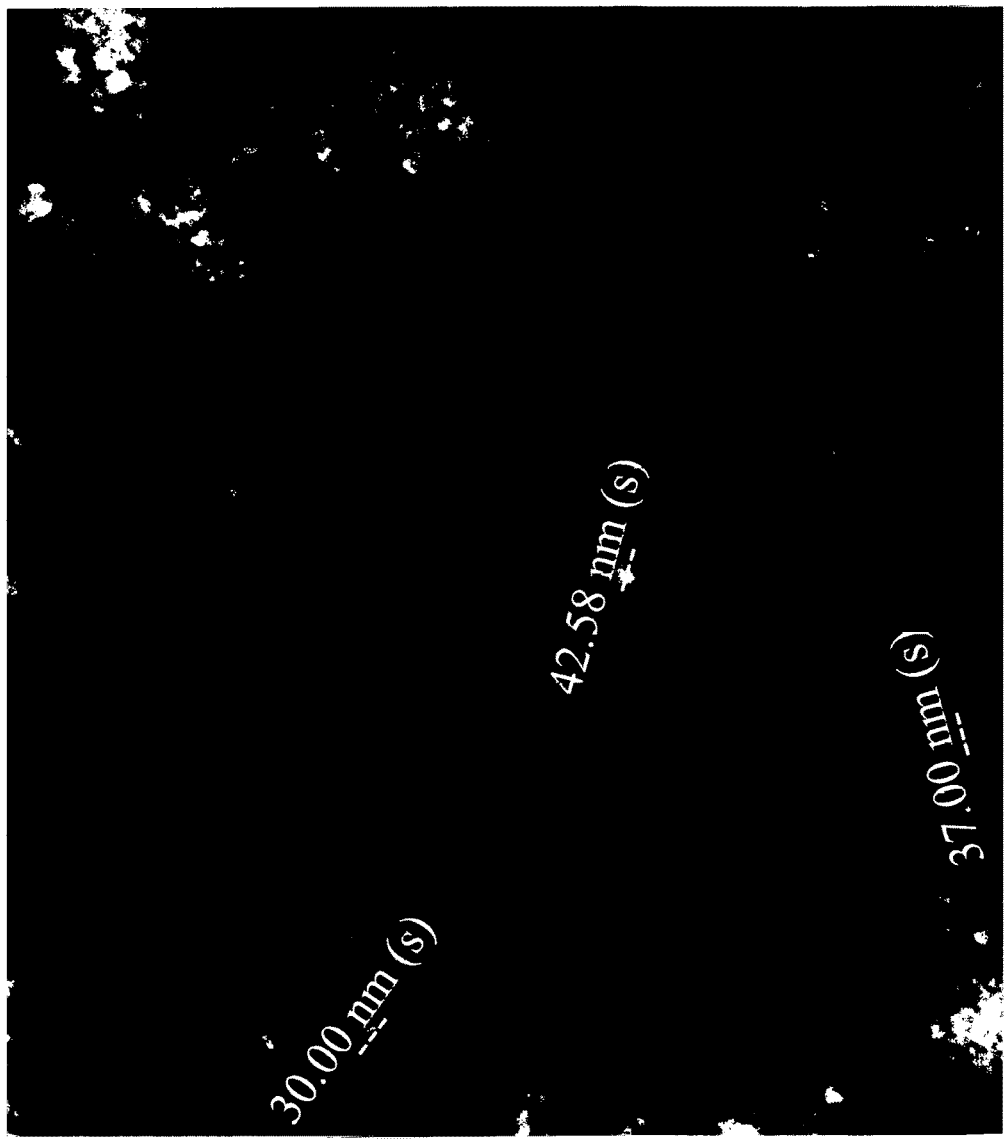

FIGS. 11A-B show SEM micrographs of reduced (A) and calcined-reduced (B) catalysts.

Figure 12:
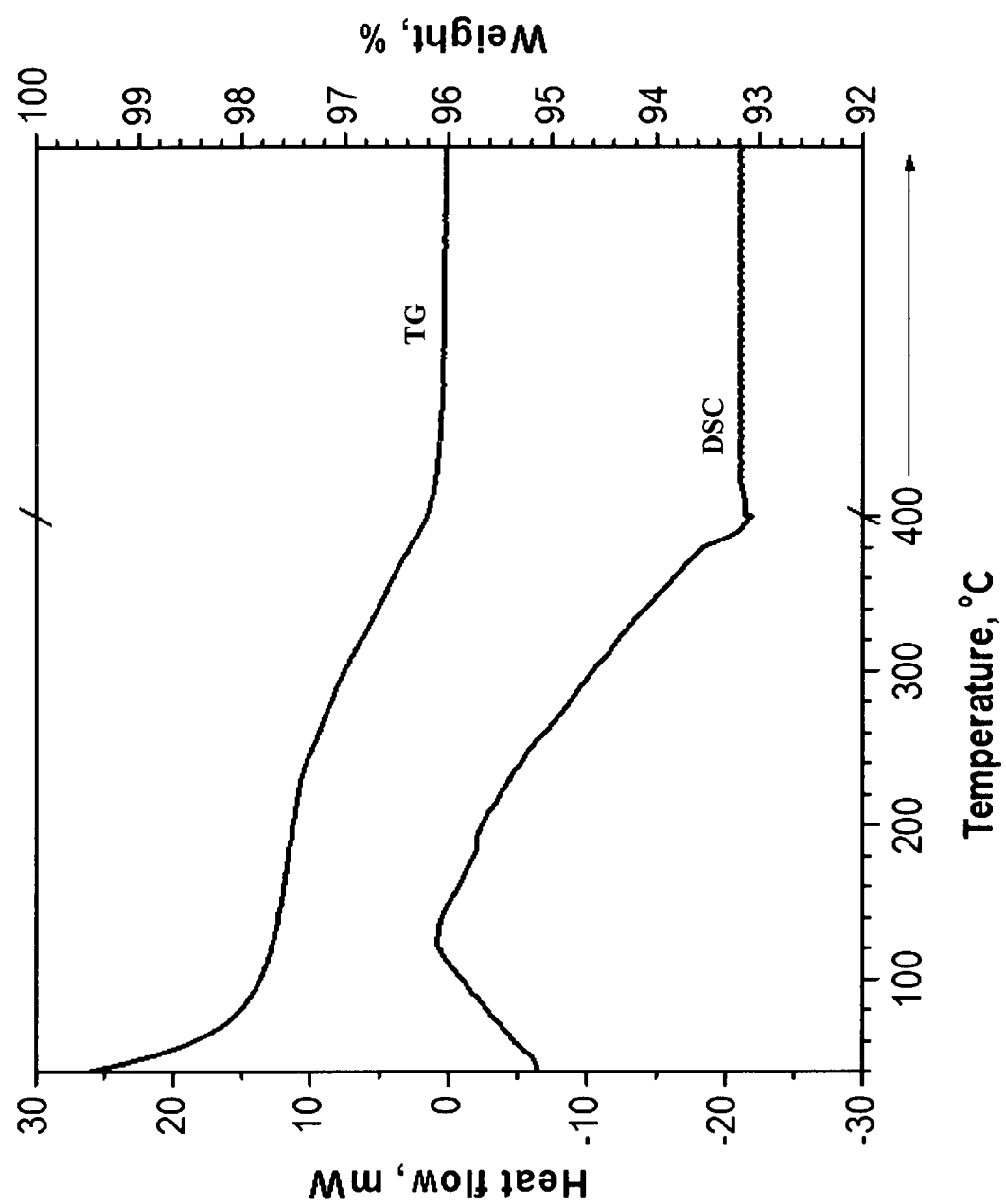

FIG. 12 shows TGA-DSC results for reduction of NiO formed after decomposition of $Ni(NO_3)_2$.

DETAILED DESCRIPTION

Disclosed herein are methods for preparing reforming catalysts. The reforming catalysts may be useful for dry reforming of methane. The method may comprise depositing a metal precursor on a porous support by wet impregnation. The porous support may be fumed silica, a fumed metal oxide, or combinations thereof. The method may further comprise drying the porous support after depositing the metal precursor to form a powder. The method may further comprise adding additional porous support to the powder to form a diluted powder, and pressing the diluted powder to form pellets. The step of adding additional porous support to the powder to form a diluted powder, and pressing the diluted powder to form pellets, is referred to as pressure dilution. The methods described herein may result in the formation of reforming catalysts with improved stability compared to catalysts prepared without pressure dilution. The methods described herein may result in the formation of reforming catalysts with increased dispersion of the metal precursor compared to catalysts prepared without pressure dilution.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "noble metal" refers to a metal that is resistant to corrosion and oxidation in moist air. Noble metals include ruthenium (Ru), rhodium (Rh), palladium (Pd), silver (Ag), osmium (Os), iridium (Ir), platinum (Pt), and gold (Au).

The terms "pressure dilution", "pressure-dilution", and "p-dilution" are used interchangeably herein to describe the process of adding additional porous support and pressing the resultant powder to create pellets. The terms "pressure diluted catalyst", "pressure-diluted catalyst", and "p-diluted catalyst" are used interchangeably herein to describe a catalyst prepared by a method involving a pressure dilution step.

The term "transition metal" as used herein refers to an element whose atom has a partially filled d sub-shell, or which can give rise to cations with an incomplete d sub-shell. Transition metals generally occupy the d-block of the periodic table, although some transition metals may occupy the f-block of the periodic table. Transition metals include scandium (Sc), titanium (Ti), vanadium (V), chromium (Cr), manganese (Mn), iron (Fe), cobalt (Co), nickel (Ni), copper (Cu), yttrium (Y), zirconium (Zr), niobium (Nb), molybdenum (Mo), technetium (Tc), ruthenium (Ru), rhodium (Rh), palladium (Pd), silver (Ag), lanthanum (La), hafnium (Hf), tantalum (Ta), tungsten (W), rhenium (Re), osmium (O), iridium (I), platinum (Pt), gold (Au), actinium (Ac), rutherfordium (Rf), dubnium (Db), seaborgium (Sg), bohrium (Bh), hassium (Hs), meitnerium (Mt), darmstadtium (Ds), and roentgenium (Rg).

2. Method for Preparing a Reforming Catalyst

Disclosed herein are methods for the preparation of a reforming catalyst. The reforming catalyst may be useful for dry reforming of methane (DRM). The method may comprise depositing a metal precursor on a porous support. The porous support is selected from the group consisting of fumed silica, a fumed metal oxide, and combinations thereof. The porous support may be fumed silica. The porous support may be a fumed metal oxide. For example, the porous support may be a fumed alumina, a fumed titania, or combinations thereof. Examples of fumed silica and fumed metal oxides that may be used in the disclosed method include, but are not limited to, those disclosed in U.S. Pat. Nos. 8,087,450, 7,910,081, 8,038,971, 8,729,158, and 7,572,423, the entire contents of which are incorporated herein by reference.

a. Metal Precursor

The metal precursor may comprise a catalytically active metal, a metal nitrate, a metal acetate, a metal chloride, a metal sulfate, or combinations thereof. The metal precursor may comprise a transition metal, a noble metal, or combinations thereof. For example, the metal precursor may comprise a transition metal. The metal precursor may comprise a noble metal. The metal precursor may comprise a combination of transition metals and/or noble metals. Suitable metals that may be used in the presently disclosed method include nickel, platinum, copper, iron, cobalt, palladium, rhodium, and combinations thereof. Any suitable form of the metal precursor may be used in accordance with the disclosed methods. For example, the metal precursor may be anhydrous. As another example, the metal precursor may be hydrated.

In some embodiments, the metal precursor comprises nickel. The nickel precursor may comprise a nickel oxide, a nickel nitrate, a nickel acetate, a nickel chloride, a nickel sulfate, or combinations thereof. For example, the nickel precursor may comprise a nickel nitrate. In some embodiments, the metal precursor may be nickel nitrate hexahydrate ($Ni(NO_3)_2 \cdot 6H_2O$).

b. Wet Impregnation

The metal precursor may be deposited on the porous support by wet impregnation. For wet impregnation, the metal precursor may be dissolved in any suitable solvent before being deposited on the porous support. For example, the metal precursor may be dissolved in water before being deposited on the porous support. As another example, the metal precursor may be dissolved in ethanol before being deposited on the porous support. The method may further comprise drying the porous support after depositing the metal precursor to form a powder. The porous support may be dried at any suitable temperature for any suitable duration to achieve the desired result. For example, the porous support may be dried at a temperature from about 25° C. to about 200° C. The porous support may be dried at a temperature from about 25° C. to about 200° C., about 50° C. to about 175° C., about 75° C. to about 150° C., or about 100° C. to about 125° C. For example, the porous support may be dried at about 25° C., about 30° C., about 40° C., about 50° C., about 60° C., about 70° C., about 80° C., about 90° C., about 100° C., about 110° C., about 120° C., about 130° C., about 140° C., about 150° C., about 160° C., about 170° C., about 180° C., about 190° C., or about 200° C. Any suitable combination of temperatures may be used for any suitable duration to achieve the desired result. For example, the porous support may be dried at 70° C., followed by drying at 110° C.

The porous support may be dried for any suitable duration to achieve the desired result. For example, the porous support may be dried for about 1 hour to about 72 hours. The porous support may be dried for about 1 hour to about 72 hours, from about 12 hours to about 60 hours, about 24 hours to about 48 hours, or about 36 hours. For example, the porous support may be dried for about 24 hours.

c. Pressure Dilution

The method further comprises adding additional porous support to the powder to form a diluted powder, and pressing the diluted powder to form pellets. The process of adding additional porous support to the powder to form the diluted powder, and pressing the diluted powder to form pellets is referred to as pressure dilution. The additional porous support may be added to the powder at any suitable ratio to achieve the desired result. For example, the additional porous support may be added to the powder at a ratio of about 0.1:2 to about 2:0.1. For example, the additional porous support may be added to the powder at a ratio of about 0.1:2, about 0.5:1.5, about 1:1, about 1:5:0.5, or about 2:0.1 by weight. The additional porous support may be added to the powder at a ratio of about 0.5:1.5, about 0.6:1.4, about 0.7:1.3, about 0.8:1.2, about 0.9:1.1, or about 1:1. In some embodiments, the additional porous support may be added to the powder at a ratio of about 1:1.

The additional porous support may be added to the powder to produce a diluted powder comprising any suitable % by weight of the metal to achieve the desired result. For example, the diluted powder may comprise about 1% to about 20% metal by weight. The powder may comprise about 1%, about 5%, about 10%, about 15%, or about 20% metal by weight. In some embodiments, the diluted powder may comprise about 5% metal. For example, the diluted powder may comprise about 5% nickel.

The resulting diluted powder may be pressed at about 2,000 psi to about 15,000 psi. For example, the diluted powder may be pressed at about 2,000 psi to about 15,000 psi, about 3,000 psi to about 14,000 psi, about 4,000 psi to about 13,000 psi, about 5,000 psi to about 12,000 psi, about 6,000 psi to about 11,000 psi, about 7,000 psi to about 10,000 psi, or about 8,000 psi to about 9,000 psi. In some embodiments, the diluted powder may be pressed at 5,000 psi. In other embodiments, the diluted powder may be pressed at 10,000 psi.

d. Reduction

The method may further comprise reducing and/or calcining the pellets. In some embodiments, the method may further comprise reducing the pellets. Reduction may be performed using any suitable reducing agent. For example, the pellets may be reduced by hydrogenation. Hydrogenation may be performed with $H_2$. Reduction may be performed at any suitable temperature for any suitable duration under any suitable $H_2$ pressure to achieve the desired result. The temperature, duration, and $H_2$ pressure may vary depending on the metal precursor used. For example, in embodiments wherein the metal precursor is comprises nickel may require higher reduction temperatures, longer durations, and or higher $H_2$ pressure compared to embodiments wherein the metal precursor comprises platinum, palladium, rhodium, or ruthenium. In some embodiments, the pellets may be reduced at about 250° C. to about 900° C. For example, the pellets may be reduced at about 250° C., about 300° C., about 350° C., about 400° C., about 450° C., about 500° C., about 550° C., about 600° C., about 650° C., about 700° C., about 750° C., about 800° C., about 850° C., about 900° C. In some embodiments, the pellets may be reduced at about 5% $H_2$. In some embodiments, the pellets may be reduced at about 10% $H_2$. The pellets may be reduced for about 30 minutes to about 150 minutes. For example, the pellets may be reduced for about 30 minutes to about 150 minutes, about 60 minutes to about 120 minutes, or about 90 minutes.

3. Reforming Catalysts

Further disclosed herein are reforming catalysts prepared by the methods described herein. The reforming catalysts may display increased stability compared to catalysts prepared without pressure dilution. For example, the reforming catalysts may display increased nickel dispersion compared to catalysts prepared without pressure dilution. The reforming catalysts may display nickel dispersion of from about 20% to about 80%. For example, the reforming catalysts may display nickel dispersion of about 20%, about 30%, about 40%, about 50%, about 60%, about 70%, or about 80%. Nickel dispersion may be measured by any suitable method known in the art. For example nickel dispersion may be measured by CO chemisorption.

The compounds and processes of the invention will be better understood by reference to the following examples, which are intended as an illustration of and not a limitation upon the scope of the invention.

4. Examples

The following Examples are offered as illustrative as a partial scope and particular embodiments of the disclosure and are not meant to be limiting of the scope of the disclosure.

Example 1

Experimental Procedures

Catalyst Preparation: A 10% Ni on fumed $SiO_2$ catalyst was prepared by wet impregnation. 1.089 g nickel nitrate hexahydrate ($Ni(NO_3)_2 \cdot 6H_2O$, Alfa Aesar, 98%) was dissolved in water (~40 ml) and the solution was impregnated onto 2 g of fumed $SiO_2$ (Alfa Aesar, nominal surface area ~400 m$^2$/g, measured ~326 m$^2$/g, Table 1). This mixture was dried at 70° C. on a hot plate with magnetic stirring (200 rpm) for 24 h and then dried again at 110° C. for 24 h without stirring. The resulting powder was then pressed (10,000 psi) crashed and sieved to obtain particles of about 1 mm in diameter, hereafter referred as regular 10% Ni/$SiO_2$ catalyst. One batch of powder was mixed with additional fumed $SiO_2$ (ratio 1:1) before pelletizing the mixture, a method referred hereafter as pressure diluted (p-diluted) catalyst with 5% Ni/$SiO_2$ content. The pelletized particles were crushed and sieved and then reduced before reaction.

Catalyst activity: Catalytic activity was measured in a continuous flow fixed bed quartz reactor (300 mm of length and 10 mm ID) at atmospheric pressure. The fresh untreated catalyst (50 mg for regular catalyst and 100 mg for p-diluted catalyst filling a reactor volume of 0.15 cc) was loaded into the reactor and either directly reduced at 400° C. for 90 min in 5% $H_2$ (90 ml/min) referred as reduced-only catalyst, or first calcined in air (90 ml/min) at 600° C. for 5 h and then reduced at 400° C. with 5% $H_2$ (90 ml/min) denoted as calcined-reduced catalyst. After pretreatment, the reactor was purged with $N_2$ (50 ml/min), and the temperature was increased to the reaction temperature of 600° C. at a heating rate of 15° C./min. Upon reaching 600° C., a stream containing 20% $CH_4$, 20% $CO_2$ and 60% He was introduced at 120 cc/min corresponding to a gas hourly space velocity (GHSV) of 1440 L/$g_{Ni}$ h for both regular and p-diluted catalysts. The GHSV is reported by g of Ni since catalysts with different % of Ni were used.

The composition of the effluent stream was measured using 2 gas chromatographs (GC). The first GC was equipped with an Alltech's CTR-I double packed column using 30 ml/min He as a carrier gas to separate $CO_2$, CO, and $CH_4$. The second GC was equipped with a 6' molecular sieve 5 Å column in series with a 20' HAYSEP D column, using Ar as a carrier gas at 30 ml/min, and kept at 30° C. to separate $H_2$ and He. $CH_4$ and $CO_2$ conversions and $H_2/CO$ molar ratio were calculated as described in Eqs. (1)-(3) respectively, where Fi represents the molar flow rate of species i. Reaction rates were calculated under differential reaction conditions (i. e. $XCH_4<15\%$) by multiplying the molar flow rate of methane by the conversion divided by the weight of Ni loaded into the samples.

$$X_{CH_4} = \frac{F_{CH_4,in} - F_{CH_4,out}}{F_{CH_4,in}} \times 100 \quad (1)$$

$$X_{CO_2} = \frac{F_{CO_2,in} - F_{CO_2,out}}{F_{CO_2,in}} \times 100 \quad (2)$$

$$\frac{H_2}{CO} = \frac{F_{H_2,out}}{F_{CO,out}} \quad (3)$$

Catalyst characterization: The catalyst's bulk structure was determined by X-ray diffraction (XRD) in a Bruker diffractometer (D8 Advance) using Cu Kα radiation, at 40 kV and 40 mA. The step-scan size of 0.02° and counting time of 1 s was used for the angular range of 20-80° (2θ). Textural characterizations such as BET surface area, pore volume, and pore size distribution for fresh catalysts were measured in a Micromeritics ASAP 2020 adsorption apparatus after being vacuum degassed for 16 h at 130° C. The Ni surface area and dispersion were determined in the same instrument by CO chemisorption. Samples were first pretreated in-situ in hydrogen flow at 400° C. for 90 min. After cooling to 35° C., CO chemisorption was performed at that temperature with the CO pressures between 100 and 350 mbar. Dispersion was calculated from CO chemisorption assuming crystallites were hemispherical and a 1:1 stoichiometry and that the crystallites were reduced. A TGA-DSC apparatus (Mettler-Toledo) was used to perform in-situ thermogravimetric analysis. About 30 mg of untreated fresh catalyst was placed on the heating stage and heated to 400° C. at a rate of 15° C./min in either, nitrogen, air, or 5% $H_2$ (balance $N_2$) at 50 ml/min. In each case, after reaching 400° C., the temperature was kept constant for 1 h. An FESEM Magellan 400 (FEI) field emission scanning electron microscope (SEM) was used to image the catalysts. Spent catalysts were also imaged using a FEI Titan 80-300 transmission electron microscope (TEM) with a point-to-point resolution of 0.19 nm with information limit below 0.1 nm. Cross sections of carbon tube clumps were obtained using Helios NanoLab DualBeam 600 (FEI) SEM/FIB workstation. X-ray photoelectron spectroscopy (XPS) measurements were carried out in a PHI Versa-Probe II spectrometer, using Al Kα radiation at 1486.6 eV under high power mode. A Multipak software package was used to de-convolute the spectral peaks and determine relative elemental surface concentrations. The amount of carbon in the catalysts was measured in a Costech ECS 4010 elemental C analyzer equipped with a specialized gas chromatograph (GC). Acetanilide (71.09% carbon content) was used as a calibration standard.

Example 2

Catalyst Characterization

XRD patterns of fresh catalysts prepared by wet impregnation after various pretreatments (FIG. 10) show that the reduced-only catalyst exhibits XRD lines at 2θ=44.2, 51.4 and 76.2°, corresponding to metallic Ni, with crystallite sizes in the 5-30 nm range as determined by SEM (FIG. 11A). The XRD pattern of the calcined catalyst (FIG. 10), has lines at 2θ=37.0, 43.0, 62.6, 75.2 and 79.2° corresponding to NiO. The calcined-reduced catalyst exhibits an XRD pattern corresponding to metallic Ni (FIG. 10), but with crystallite sizes in the 25-60 nm size (FIG. 11B) range due to sintering at the relatively high calcination temperature used (600° C.).

BET surface area values for catalysts after different pretreatments are presented in Table 1. Regardless of wet impregnation, dilution, reduction and calcination-reduction pre-treatments, all catalysts exhibit similar surface areas.

TABLE 1

BET area and Ni dispersion results for fresh catalyst's particles (pressed 10,000 psi) after different pretreatments

| Sample | Treatment | BET surface area, $m^2/g$ | Metal dispersion |
|---|---|---|---|
| Fumed $SiO_2$ | fresh powder | 326 | N/A |
| Fumed $SiO_2$ | pressed particles | 269 | N/A |
| Regular catalyst (10% Ni content) | reduced-only | 262 | 19% |
|  | calcined-reduced | 267 | 7% |
| P-diluted catalyst (5% Ni content) | reduced | 276 | 61% |
| Regular catalyst (5% Ni content) | reduced | 265 | 39% |

Pressing the fresh impregnated powders to form pellets at 10,000 psi is the main factor decreasing the surface area. This is confirmed by the surface area of unimpregnated fumed $SiO_2$ before and after pelletizing, which decreases from 316 $m^2/g$ to 269 $m^2/g$, similar to the values obtained for the impregnated catalysts (Table 1).

Ni dispersion results calculated from CO chemisorption are also listed in Table 1. The calcined-reduced catalyst exhibits the lowest dispersion due to partial sintering at 600° C. during calcination. For reduced-only catalysts, dispersion is higher than on the calcined-reduced catalysts, but it is the highest at 61% for the pressure-diluted catalyst. Even higher dispersion was obtained at 5000 psi, as shown in FIG. 7.

Figure 1:
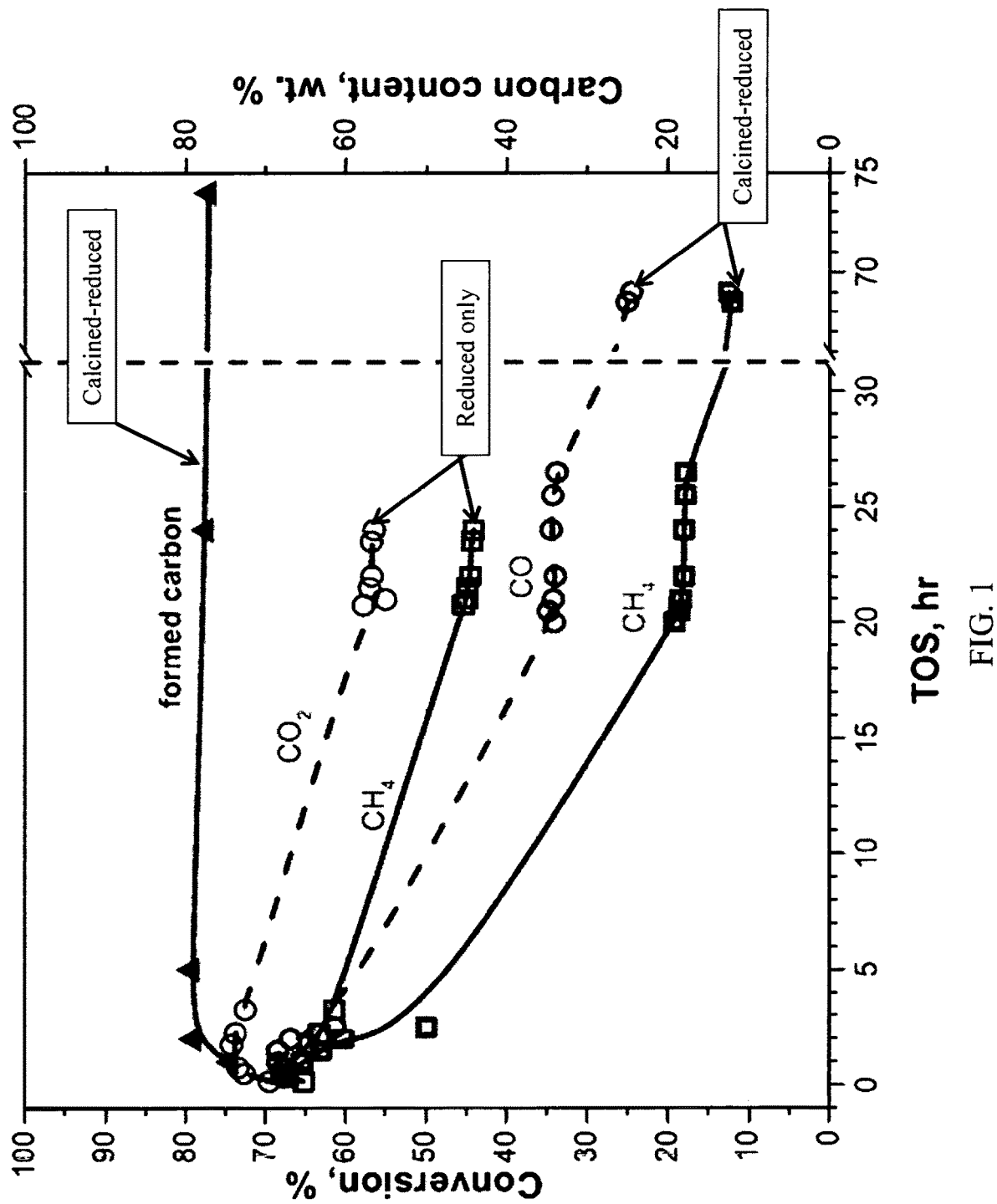

Methane and carbon dioxide conversions vs time on stream (TOS) for reduced-only and calcined-reduced catalysts are shown in FIG. 1. For both pretreatments, conversion reached a maximum at the beginning of the run (82% equil. methane conversion) and remained nearly constant for the first 1-2 h, then decreased with TOS, with the calcined reduced catalysts deactivating at a higher rate. The activation energy for the reduced catalysts during 1 h TOS was 91.1 kJ/mol. The reaction rate of 8.5 [mol of $CH_4/g_{Ni}$ h], measured at lower temperatures to reach differential conditions, but at a GHSV of 1440 $L/g_{Ni}$ h is fairly high for Ni, resulting in the high conversions at 600° C. reported herein. For comparison, in the case of the noble metal catalyst $Pt/ZrO_2$ the reported reaction rate is in the range of 14-17.4 [mol of $CH4/g_{Pt}$ h].

To ascertain the effect of diffusion on the kinetics, the Weiz-Prater observable was calculated, substituting the proper numerical values (see Table 2) obtained a value of 0.3, indicating that diffusion is not limiting the reaction rate at 600° C.

TABLE 2

| | | |
|---|---|---|
| $\hat{L}$ | Length of reactor | 0.002 m |
| $C_{Ao}$ | Feed concentration of methane | $8.92 \times 10^{-6}$ mol mL$^{-1}$ |
| $V_{reactor}$ | Volume of reactor | 0.157 cc |
| X | Conversion of methane | 0.15 |
| $F_{Ao}$ | Feed molar flow rate of methane | $1.071 \times 10^{-3}$ mol min$^{-1}$ |
| $R_{A, obs}$ | Observable reaction rate | $8.28 \times 10^{-3}$ mol mL$^{-1}$ min$^{-1}$ |
| $D_{AB}$ | Molecular diffusivity of methane in CO$_2$, He mixture | $1.33 \times 10^{-2}$ m$^2$ min$^{-1}$ |
| $\varepsilon$ | Pellet porosity | 0.944 |
| $D_{A, eff}$ | Effective diffusivity | $1.185 \times 10^{-2}$ m$^2$ min$^{-1}$ |
| $\Phi$ | Weisz-Prater Observable | 0.313 |
| $Bi_m$ | Biot number for mass transfer | 100 (typical for fixed bed reactors) |

There is a discrepancy between methane and CO$_2$ conversion, which may be partly due to the carbon deposition mainly from methane, and possibly due to the reverse water-gas shift reaction.

Figure 2A:
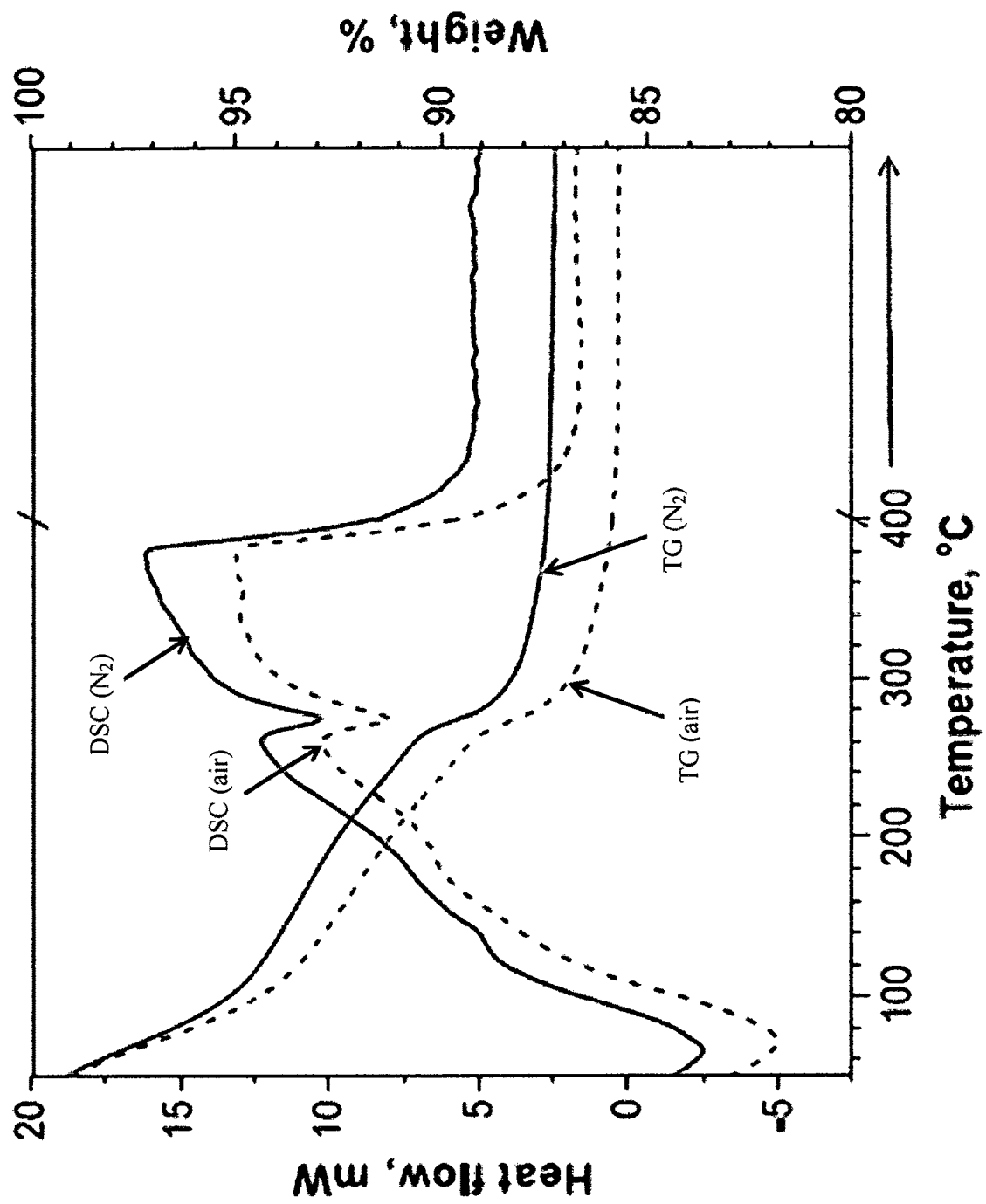

The calcined-reduced catalyst deactivated faster because of its lower Ni dispersion compared to the reduced-only catalyst (Table 1). The initial calcination treatment significantly decreased the metal dispersion, which can be avoided by using the reduction-only pretreatment. The pretreatment used in different runs was related to the deactivation time, which was faster using the calcined reduced pretreatment leading to shorter runs. The effect of pretreatment is further explained by the TGA-DSC results shown in FIG. 2A-B for the impregnated Ni(NO$_3$)$_2$.6H$_2$O/SiO$_2$ particles obtained under different gas atmospheres. In a non-reducing atmosphere (air and N$_2$, e.g. calcination step) there is ~10% continuous decrease in weight (FIG. 2A) in the temperature range of 50-260° C., corresponding to a gradual loss of 4 molecules of water out of six. A steep decrease in weight occurs at about 260° C., which is close to the decomposition temperature of Ni(NO$_3$)$_2$.2H$_2$O, along with a decrease in heat flow, corresponding to the endothermic decomposition of nickel nitrate to NiO. The reduction of NiO by hydrogen as in the calcination-reduction pretreatment, is also an endothermic process, which starts slowly at about 120° C. and is completed at about 320° C., showing featureless TGA-DSC curves (FIG. 12).

Figure 2B:
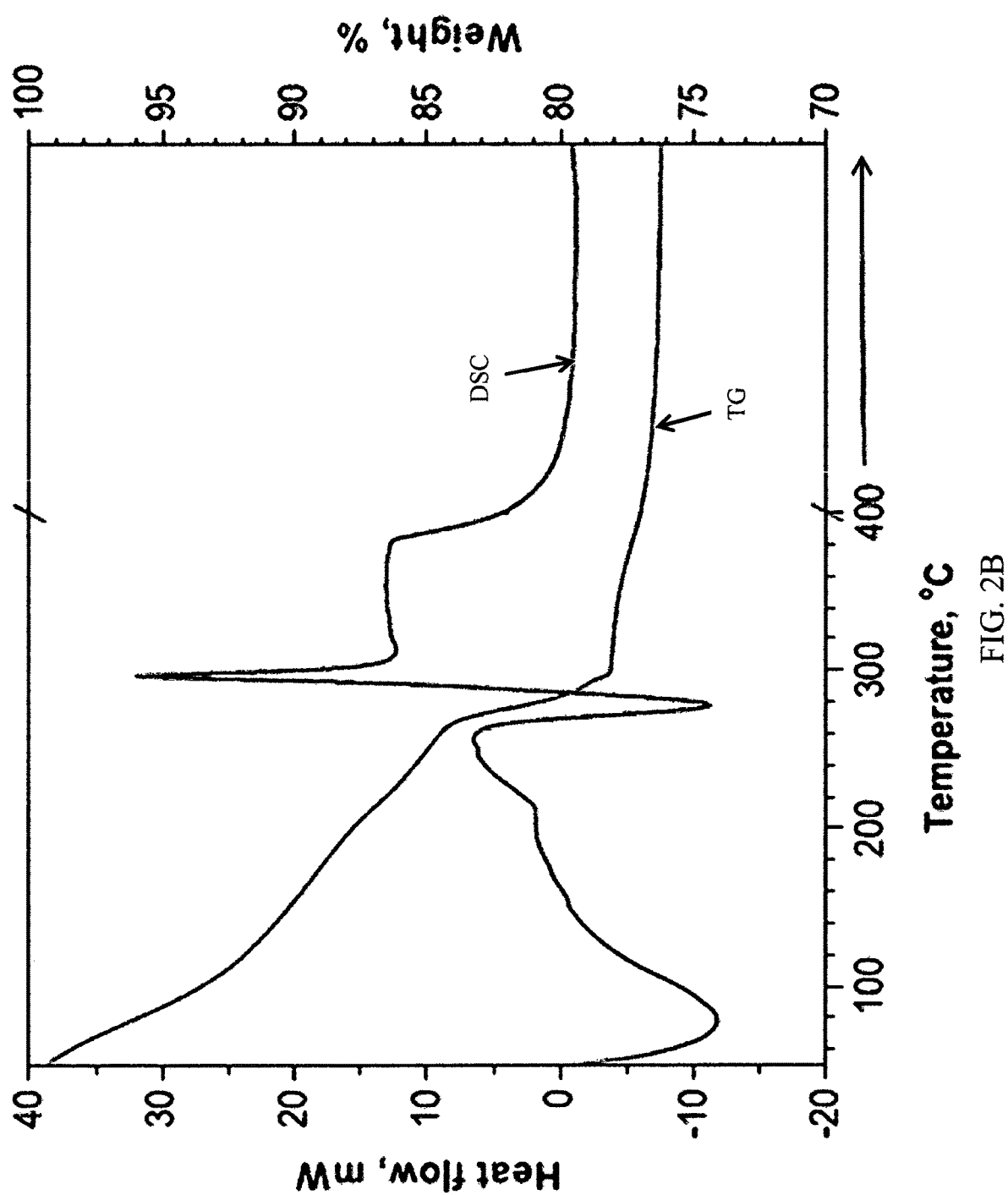

FIG. 2B shows that a different process occurs during decomposition/reduction in H$_2$. While the shape of the weight change trace is similar to the ones registered in N$_2$ or air atmospheres, the DSC results show that at the decomposition temperature of Ni(NO$_3$)$_2$.2H$_2$O in H$_2$, there is a combination of endothermic and exothermic processes. In the case of FIG. 2B, results with the reduced-only catalyst are shown to amplify the exothermic effect. This effect may be interpreted as evidence of the endothermic decomposition of Ni nitrate followed by exothermic reactions between its decomposition products and H$_2$. Similar studies of bulk nickel nitrate decomposition show that at ~250° C. the main gaseous product is N$_2$O, which could react exothermically with H$_2$. The exothermic effect (temperature increase) and the presence of H$_2$ enable rapid reduction of NiO, formed during nitrate decomposition, to metallic Ni. Compared to the endothermic processes observed during calcination-reduction pretreatment, this endothermic-exothermic single step reduction process results in increased dispersion of Ni crystallites for reduced only catalysts. The TGA/DSC and dispersion results indicate that the difference in the rate of catalyst deactivation is related to the metal crystallite size i.e. dispersion, and its distribution on the support, which in turn is affected by pretreatment.

The percentage of carbon formed at different TOS at 600° C. for calcined-reduced catalyst is also presented in FIG. 1. Carbon elemental analyzer measurements show that after only 1 h of TOS the amount of formed carbon reaches 74 wt. %, attains a maximum of about 79 wt. % after 2 h TOS, and thereafter remains nearly constant with TOS. To accommodate this much carbon the catalyst's bed volume doubles, and even though the conversion of methane is continuously decreasing, it is still around 14% after 70 h of TOS. The C deposition results for the reduced-only catalysts are similar, but the rate of carbon deposition at short TOS is not as steep.

Figure 3B:
Figure 3C:
Figure 3A:

The relatively high methane conversion at TOS>1 h begs the question of how it is possible to have an active Ni surface in the presence of so much carbon. The answer becomes clearer in the SEM micrographs, shown in FIG. 3, of the calcined-reduced catalyst after 24 h TOS (CH4 conversion ~20%). FIGS. 3A and 3B show the formation of carbon nanotubes (C-NT) with Ni crystallites appearing as bright spots located at the top of C-NT. Following the various interpretations of the DRM reaction pathways, it can be assumed that methane decomposition takes place on sites located at the interface of C—Ni crystallites located at the top of the C-NT forming Ni-carbide sites. The growth of C-NT is fast during the first hours of TOS reaching a maximum in C content, but then it stabilizes with TOS. CH$_4$ and CO$_2$ react at the interface of Ni—C-NT leading to the formation of CO and H$_2$, which start decreasing slowly with TOS. The image in FIG. 3B, at higher magnification (125,000×), shows that in certain areas, there are clumps of entangled C-NT. A further magnified image (250,000×) of the cross section of a clump, shown in FIG. 3C, was obtained by cutting it with a focused ion beam (FIB), This image shows that the clump still retains some porous structure but Ni crystallites are now encapsulated within neighboring entangled C-NTs. Thus, deactivation can be attributed to the loss of Ni active area due to encapsulation in these clumps.

FIG. 4 shows methane and CO$_2$ conversions vs TOS on calcined-reduced catalysts at 600° C. and 700° C., during the DRM and methane decomposition (without carbon dioxide). Also shown are representative SEM micrographs of the catalysts at different TOS and conditions, as well as the amount of C measured at the end of the run after 24 h and 19 h TOS at 600° C., and 700° C. respectively. During the DRM reaction, CH$_4$ conversion at 600° C. decreases to 20% after 24 h TOS, with 77 wt. % of carbon formation.

The SEM micrograph of the spent catalyst (FIG. 4B) shows the formation of large amounts of entangled C-NT with Ni crystallites embedded in the entangled C-NT rather than at their top. It appears that as more C-NT form, Ni crystallites in adjacent C-NT become in contact resulting in their encapsulation by both C-NTs.

Figure 4A:
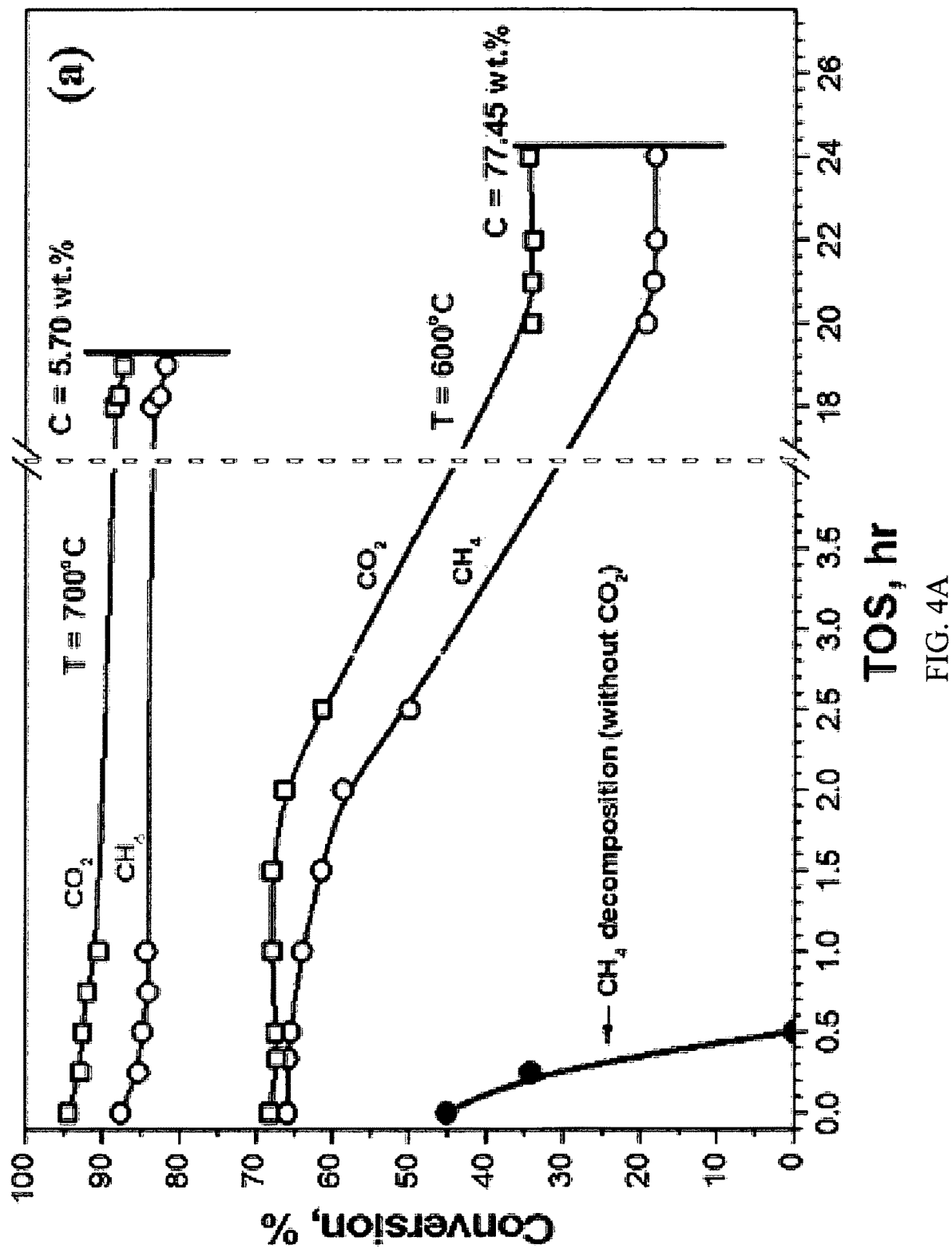
FIG. 4A is a graph showing $CH_4$ and $CO_2$ conversions during DRM for calcined-reduced catalysts at 600 and 700° C. and $CH_4$ decomposition (without $CO_2$) at 600° C.
Figure 4C:
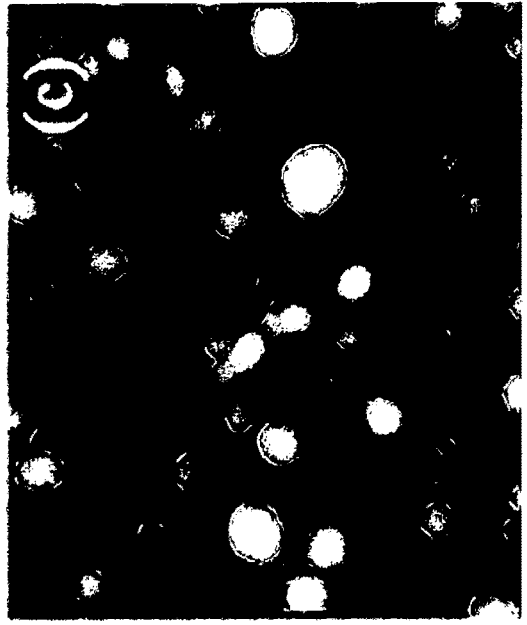
FIGS. 4B-D are SEM micrographs of spent catalysts: (B) DRM at 600° C., (C) DRM at 700° C., (D) $CH_4$ decomposition (no $CO_2$) at 600° C.
Figure 4D:
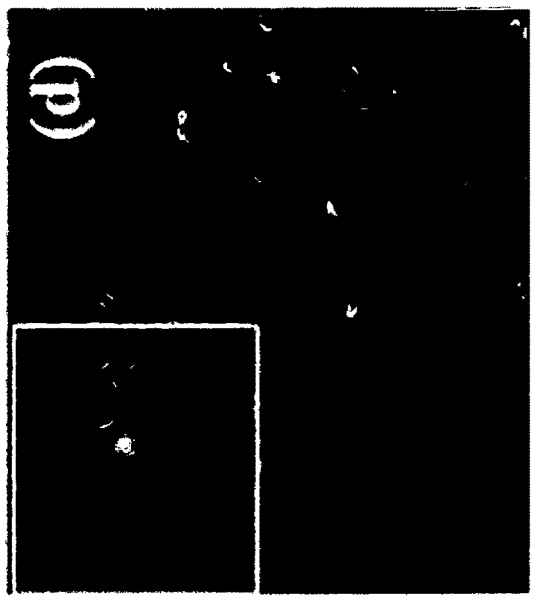
Figure 4B:
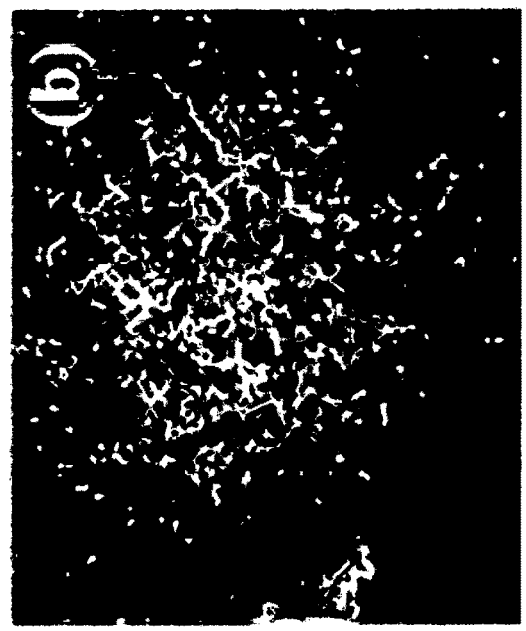

At 700° C. (FIG. 4A), the initial conversion is higher, as expected (92% conversion at equilibrium), but no significant deactivation is observed with only 5.7% of carbon formation after 19 h TOS, showing that C formation (or lack of it) correlates with increasing or decreasing rates of deactivation. It should be noted that the equilibrium amount of C formation is lower at 700° C. than at 600° C. (the equilibrium molar ratio of C at 600° C. and 700° C. is 1.6), which further contributes to the increased stability. The corresponding SEM micrograph in FIG. 4C, shows larger crystallites than at 600° C. with only a few a C-NT formed. This confirms that the decrease in C-NT formation and the lack of entanglement decreases deactivation. Conversion during CH$_4$ decomposition (without CO$_2$ present) at 600° C. is also shown in FIG. 4 for the 10% Ni/SiO$_2$ reduced-only catalyst. The reduction only pretreatment was used to be able to observe the rapid deactivation occurring during this reaction, even on the catalyst having the highest Ni dispersion. Methane conversion during its decomposition falls rapidly and the catalyst is completely deactivated after 30 min of TOS, compared with the relatively low deactivation rate occurring during the DRM in that short time period. The corresponding SEM micrograph of the spent catalyst (FIG. 4D) shows significant formation of C-NT, as in the DRM reaction. The higher magnification SEM insert (FIG. 4D) shows Ni particles encapsulated within C-NTs leading to loss of Ni interfacial area and thus to the rapid deactivation observed during methane decomposition.

C-NTs have been shown to form on Ni crystallites with sizes in the 5-160 nm range during methane dry reforming, methane steam reforming, and methane decomposition. C-NTs have also been reported to form in several transition metals such as Fe, Co, Cu with their structure depending on the C deposition reaction, support, and operating conditions used, in particular, temperature (>400° C.). Previous work during ethanol decomposition on Ni supported on silica and ceria at temperatures in the range of 250-300° C., found that for that reaction, deactivation occurs via the formation of C layers on top of Ni crystallites, and not via C-NT encapsulation.

Figure 5:
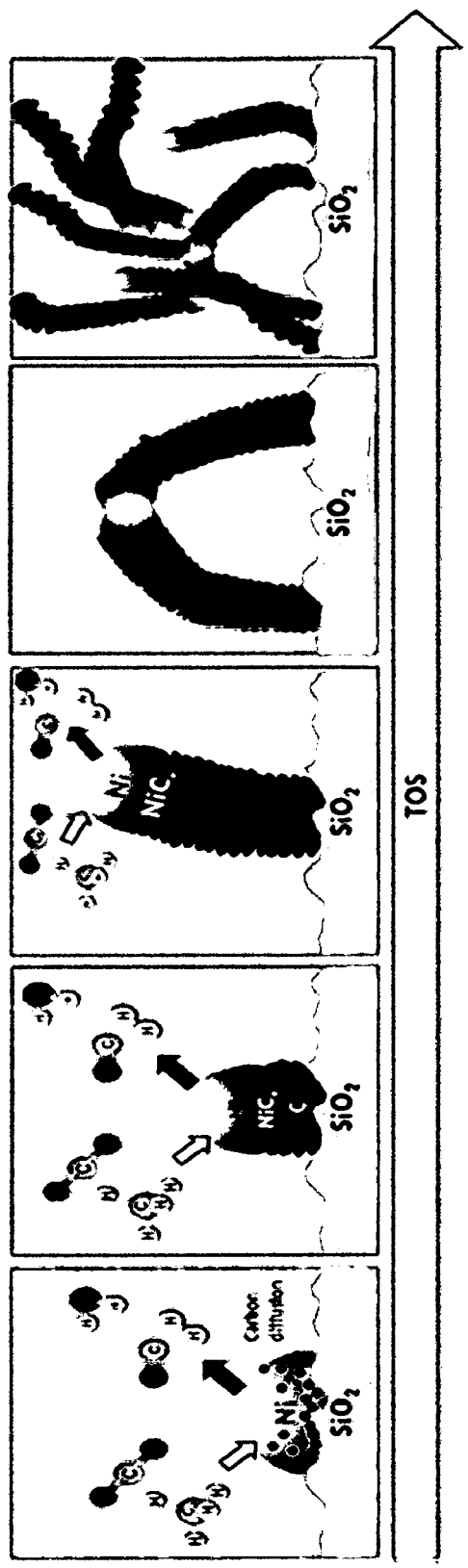
FIG. 5 is a schematic showing a model of C-NT growth during DRM reaction and encapsulation and entanglement.

The results presented in FIG. 4 also show that the presence of CO$_2$ in the DRM reaction decreases the rate of C-NT encapsulation by reacting with Ni—C-NT sites. This reaction limits the growth rate and the linking of adjacent C-NTs, and thus Ni encapsulation, decreasing the rate of deactivation during the DRM compared with methane decomposition. A CO$_2$ decomposition experiment (without methane) showed no carbon deposition at 600° C. A model of C-NT formation is presented in FIG. 5. The relation of the C-NT formation and their entanglement, with the rate of deactivation during the DRM reaction, is shown.

To observe the deactivation process in a shorter TOS, the amount of catalyst used was decreased. To prevent non-uniform catalyst distribution in the bed, and minimize the formation of channeling or voids, the catalyst was diluted with silica. The reaction was first run using standard bed dilution of the regular 10% Ni/SiO$_2$ catalyst particles with additional fumed SiO$_2$ particles in a 1:1 relation, so the amount of Ni was actually 5% (FIG. 6). As previously mentioned, to prevent diffusional limitations, all catalysts were used in the form of particles with sizes of less than 1 mm, which were obtained by pressing wet impregnated and dried powders to 10,000 psi to form a pellet that was later broken and sieved into small particles. Based on the effect of pressure on the fumed silica BET area (Table 1), the preparation was altered by first mixing the dried wet-impregnated catalysts with fumed SiO$_2$ in a 1:1 ratio, before pressing the diluted mixture to 10,000 psi and then broken into small particles. This catalyst, referred hereafter as p-diluted catalyst, also contained 5% Ni. The p-diluted catalysts particles were then loaded into the reactor and pretreated as in previous runs by reducing them before reaction.

Results obtained during the DRM reaction on various diluted catalyst using the same total amount of Ni and operating conditions (i.e. GHSV=1440 L/gNi h, 600° C.) are shown in FIG. 6A. The p-diluted catalyst exhibited a similar methane conversion (68%), than the undiluted ones, but most significantly, it did not deactivate (~1-2% conversion decrease) during the entire run of 40 h TOS. FIG. 6A also shows that the undiluted reduced-only 10% Ni/SiO$_2$ catalyst has almost the same initial methane conversion (67%) as the p-diluted catalyst, but it starts deactivating after ~2 h TOS with conversion decreasing to about 25% after 20 h TOS. Conversion results, obtained on a standard bed diluted catalyst, i.e. 10% Ni regular impregnated catalyst particles diluted with fumed SiO$_2$ particles but not pressed, show that it decreased by 25% after 23 h TOS. Likewise, an undiluted 5% Ni/silica prepared by wet impregnation only deactivates, to about 53% conversion after 24 h TOS. As before, when applying the calcination-reduction pretreatment to the p-diluted catalyst, it deactivates at a higher rate compared to the reduced-only p-diluted catalyst, with methane conversion decreasing by 15% after 20 h TOS (not shown).

SEM and TEM images at the top of FIG. 6 (FIG. 6B, C) of the spent p-diluted catalyst show fewer C-NT with bright spots. The TEM/STEM image (FIG. 6D), clearly shows metallic Ni crystallites in the bright field as well as in the STEM image of the same C-NT (FIG. 6E). This indicates again that the lower rate of deactivation of the p-diluted catalysts is due to a low concentration of C-NT formed and thus subsequent low rate of entanglement and therefore low rate of deactivation. STEM micrographs after 1 h show that the distribution of crystallites in the p-diluted catalyst does not change significantly (less than 5 nm). Likewise, in the calcined-reduced catalyst crystallites are initially large (30-60 nm) and do not change that much after 1 h of reaction.

FIG. 7A-C shows XPS results of the Ni 2p$_{3/2}$ and Si 2p signals of the fresh catalyst as well as the C1s signal of the deactivated catalyst after TOS. The Ni 2p3/2 signal of the fresh reduced-only catalyst (FIG. 7A) is relatively small, and exhibits a peak at 852.8 eV corresponding to reduced Ni, and a broader peak at around 857 eV, which can be ascribed to surface oxidized Ni. In these XPS studies the catalysts were first reduced ex-situ in the flow reactor, and then transferred to the XPS chamber with some exposure to air. Even though the samples were cleaned by plasma etching before XPS analyses, exposure to air, albeit brief, might have caused some surface oxidation resulting in some surface NiO formation, shown in the Ni 2p$_{3/2}$ XPS signal.

The small Ni 2p3/2 XPS signal may also be attributed to the fact that Ni is dispersed into the fumed SiO$_2$ pores, therefore only photoelectrons on the small fraction of crystallites located on the external surface of the catalysts samples can escape into the vacuum chamber for detection and analysis. FIG. 7B shows the large Si 2p signal at a BE of 103 eV corresponding to Si$^{+4}$ for the p-diluted catalysts, which are similar to the undiluted regular catalyst (not shown), indicating that the p-dilution process does not alter the SiO$_2$ structure.

The large XPS C1s signal of the catalyst after 1 h TOS (FIG. 7C) corresponds to 82% of the overall surface concentration, which is in agreement with the total amount of carbon measured by the elemental C analyzer. The C1s signal can be deconvoluted into four peaks, with the two large peaks at 283.5 and 284.7 eV corresponding to the formation of CeC bonds in C-NT. A smaller peak at around 286.5 eV corresponds to oxidized carbon species, probably formed at the support-C interface, and a small peak at 282 eV, can be attributed to the formation of Ni carbides that can form at the Ni—C NT interface at the top of the C-NT. Overall, XPS results are in agreement with the other characterization results and show that the oxidation state of Ni does not play a significant role in deactivation, further supporting the assumption that C-NT entanglement is the main cause of loss of active Ni area leading to deactivation.

The formation of C-NT is related to the crystallite size and can be suppressed by designing a catalyst with crystallites that does not lead to the formation of C-NT at the reaction conditions used. It should be noted that different types of C—Ni sites are formed on the Ni crystallites at the top of the C-NT, and the activity cannot be ascribed to specific sites. Based on the results, it can be assumed that the number of active sites correlates with the interfacial area of the Ni crystallites at the top of the C-NT, which is reduced by entanglement, leading to deactivation.

It remains to explain the effect of p-dilution in exhibiting high activity and low deactivation rate of these catalysts. BET results (Table 1) show that pressure alone alters the surface area of the fumed silica used, but XPS results showed that it remains as $SiO_2$.

Fumed $SiO_2$ has a very different structure than the co-precipitated one, as it is produced from the flame pyrolysis of tetraorthosilicate. A model of the growth processes in flames envisions the initial formation of rough primary particles with fractal geometry, which aggregates into highly ramified clusters. Four main processes may determine the structure of the final powders: kinetic nucleation, ballistic polymerization, sintering, and diffusion controlled aggregation.

According to the BET results (Table 1), fresh fumed $SiO_2$ is compressible, as shown by the decrease in surface area after pressing it to form a pellet and then particles. During the preparation process of p-diluted catalysts, when impregnated fumed $SiO_2$ (containing $Ni(NO_3)_2.6H_2O$) is mixed with fresh fumed $SiO_2$ and then pressed, pressure may bring the added fresh fumed $SiO_2$ closer and in direct contact with impregnated $SiO_2$.

CO chemisorption results listed in Table 3, along with Ni dispersion, show that p-diluted catalyst exhibits 61% dispersion, the highest from all the catalysts prepared in this work. The increase dispersion indicates that Ni was transferred from the undiluted particles to the additional surface area provided by the fumed $SiO_2$ layer in direct contact with it. Such transfer does not occur when the catalyst is diluted in the flow reactor by adding the same amount of fumed silica to the undiluted catalyst without using pressure.

TABLE 3

Ni dispersion results calculated by CO chemisorption for catalyst samples prepared with fumed and co-precipitated $SiO_2$.

| Catalyst | Pressing pressure | Metal dispersion | Calculated crystallite size |
|---|---|---|---|
| Fumed $SiO_2$ (~320 m$^2$/g), 10 wt. % Ni | N/A (powder) | 18.5% | 5.5 nm |
| | 10,000 psi | 19.4% | 5.2 nm |
| Fumed $SiO_2$ (~320 m$^2$/g), 5 wt. % Ni | 10,000 psi | 39.2% | 2.6 nm |
| Fumed $SiO_2$ (~320 m$^2$/g), p-diluted | 10,000 psi | 61.2% | 1.7 nm |
| Co-precipitated $SiO_2$ (~200 m$^2$/g), 10 wt. % Ni | 10,000 psi | 18.8% | 5.4 nm |
| Co-precipitated $SiO_2$ (~200 m$^2$/g), p-diluted | 10,000 psi | 17.8% | 5.7 nm |

In the diluted bed, fumed silica is not in a very close contact with the undiluted regular catalysts as in the p-diluted catalyst, and thus Ni is not transported into the added fumed silica, without affecting dispersion. This is confirmed by the Ni dispersion results measured after applying different pressures during the preparation of p-diluted catalysts. FIG. 8 shows that even pressing the initial powder at 1000 psi, Ni dispersion in the final catalyst increases more than twice to about 47%. The maximum dispersion of 67% is observed when pressing the particles at 5000 psi, which suggest that at this pressure, the newly incorporated fumed silica is located at the optimal distance, from the impregnated fumed silica to facilitate Ni transport to the added fumed silica. Further increase in the pressure decreases dispersion, possibly due to diffusion limitations during Ni transfer.

Figure 9A:
Figure 9B:
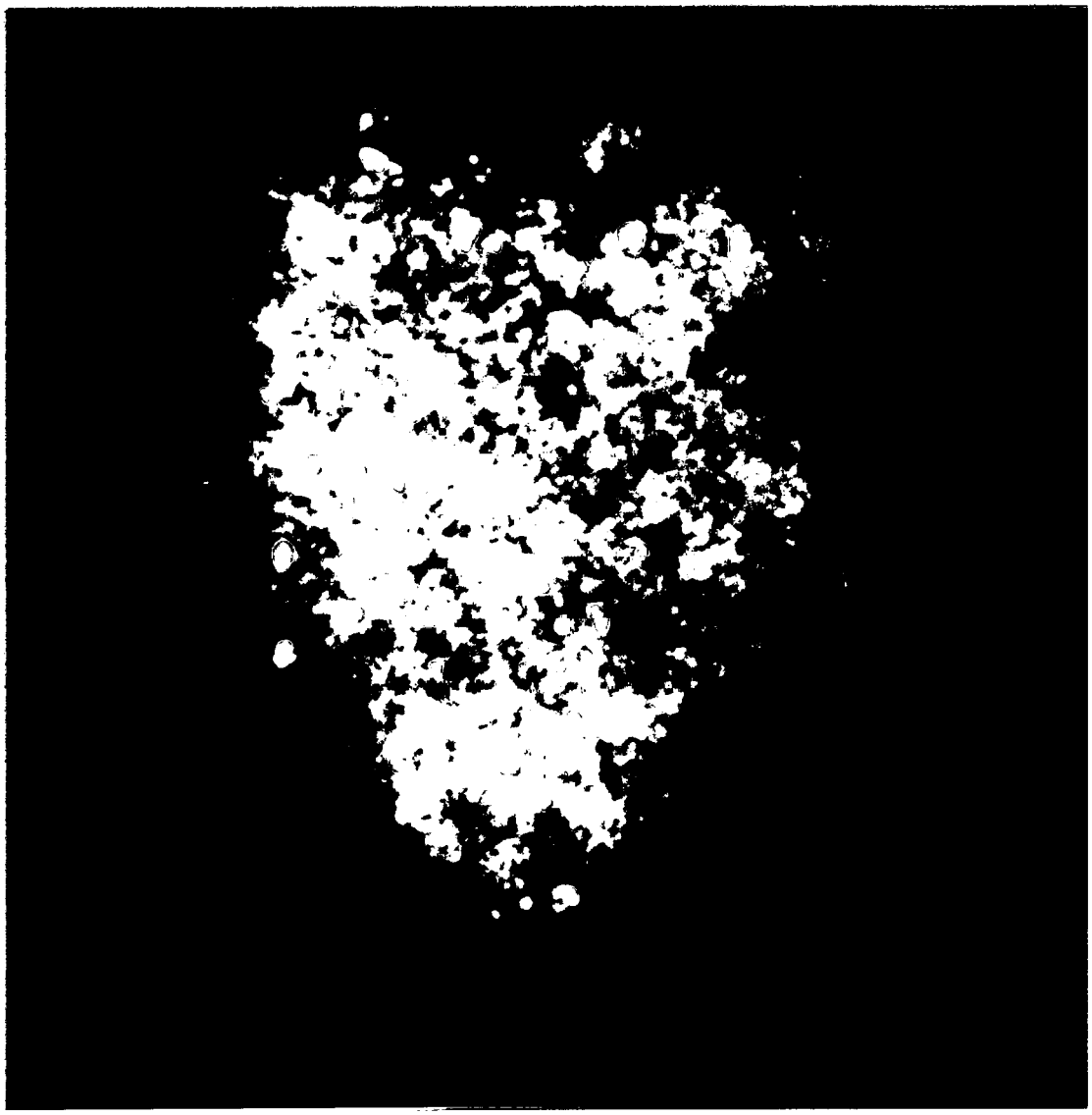
Figure 9C:
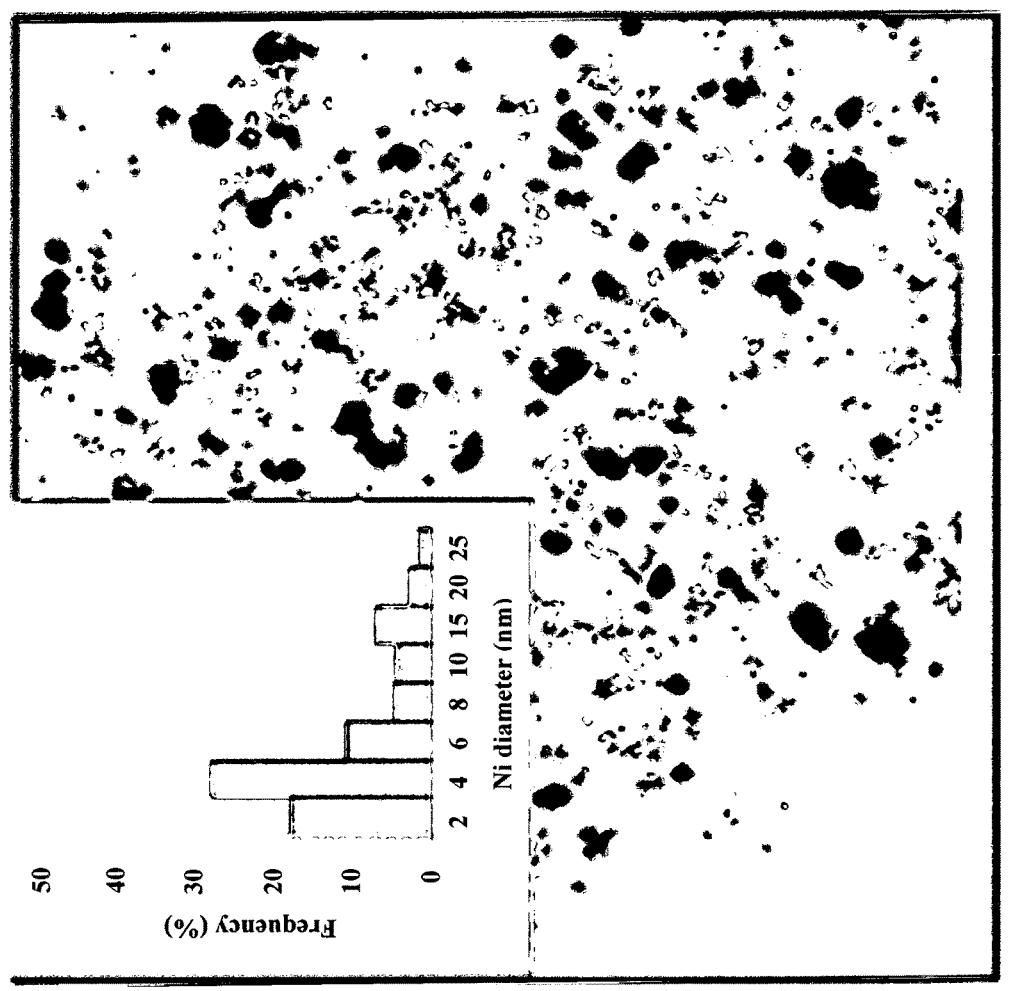
Figure 9D:
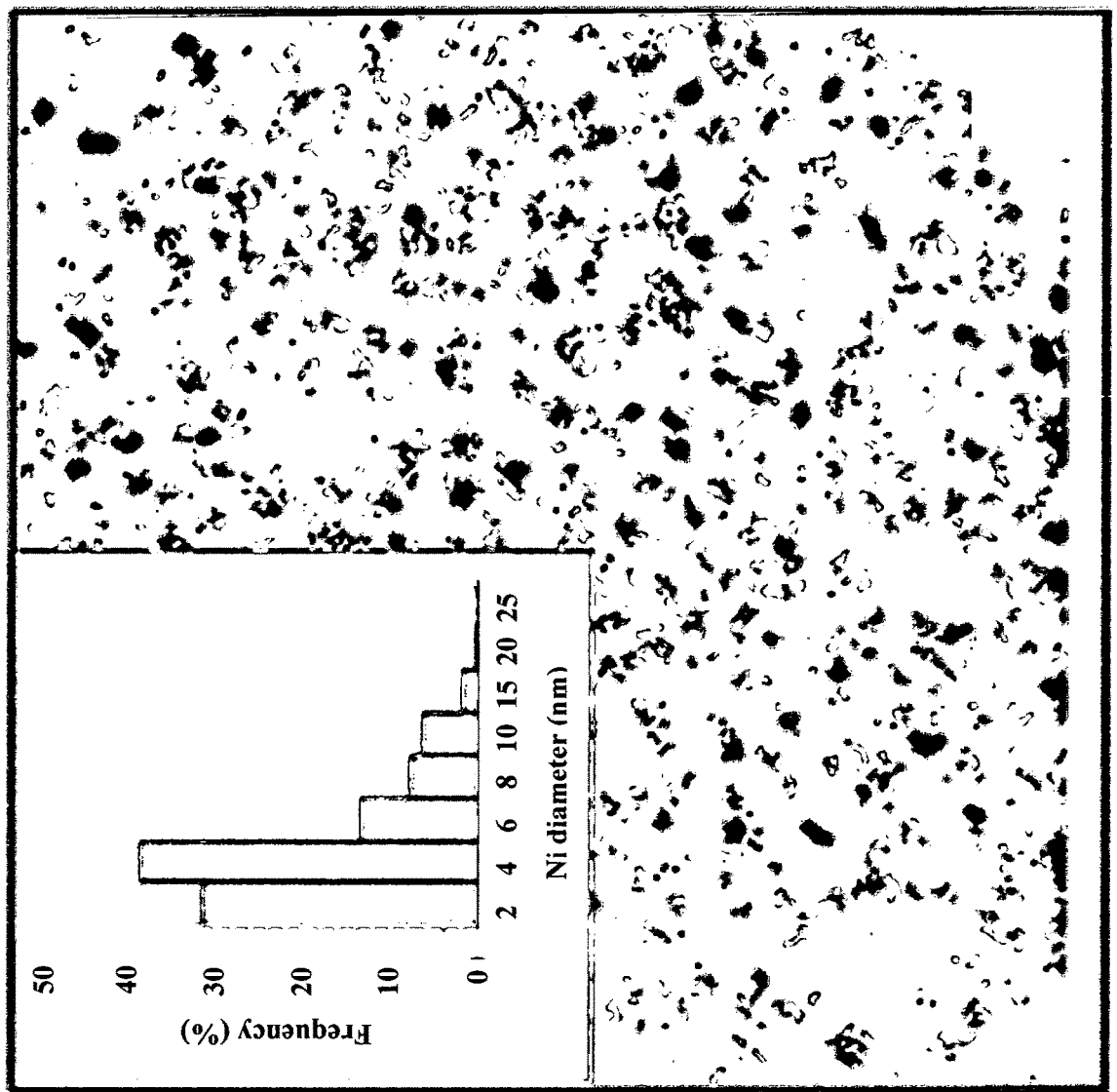

In addition to the chemisorption results, TEM/STEM analyses also confirm the re-distribution of Ni crystallites in p-diluted catalysts. FIGS. 9A-B show images of regular and p-diluted freshly prepared catalysts. The undiluted regular catalyst contains a larger fraction of large Ni crystallites (appearing as bright spots) compared to the p-diluted one. Using contrasted-thresholded images at higher magnification, the Ni crystallite size distribution shows that in the case of the p-diluted catalyst, the total fraction of Ni crystallites with sizes <4 nm is about 70% (FIG. 9D), whereas in the case of regular catalyst it's around 45% (FIG. 9C).

For p-diluted catalysts there are very few Ni crystallites of 15 nm, but for regular undiluted catalysts the fractions of crystallites >15 nm is about 35%. When the p-dilution preparation was repeated using regular co-precipitated $SiO_2$ (Sigma Aldrich, nanopowder silica with 180-225 m$^2$/g surface area), the increase in dispersion and stability observed on Ni supported on fumed $SiO_2$ catalyst were not observed (FIG. 6 and Table 3). Therefore, the fumed $SiO_2$ structure plays an important role in the increased dispersion due to pressure dilution.

A couple of processes can be proposed to explain the transport of Ni in the p-diluted catalyst resulting in increased dispersion: one via transport of the quasi-melted precursor, and the other by gas phase transport during reduction. Ni nitrate has low melting point (56.7° C. for hexahydrate, 85.4° C. for tetrahydrate and 181° C. for dihydrate) and during drying, the impregnated catalysts were heated to 110° C. It follows that the $Ni(NO_3)_2$ precursor can be in the form a quasi-liquid melt (see FIG. 2) and such phase can spread on the added fumed $SiO_2$ layer. Upon reaching the decomposition temperature of $Ni(NO_3)_2$, and further reduction, smaller crystallites of Ni can form, leading to higher dispersion. The second possible transport mechanism is via gas phase diffusion of the gas phase species formed during the decomposition/reduction pretreatment, which can be deposited into the added silica layer.

Example 3

Conclusions

Ni/SiO$_2$ catalysts prepared by wet impregnation of fumed $SiO_2$ with $Ni(NO_3)_2.6H_2O$ were pretreated in-situ by H$_2$ reduction-only (400° C.) and by air calcination (600° C.)-reduction. TGA/DSC results indicate that reduction only pretreatment results in endothermic decomposition combined with exothermic reduction of $Ni(NO_3)_2.6H_2O$, and endothermic decomposition only for the samples calcined in air. These two treatments yield catalysts with the same initial activity but different rates of deactivation, with the calcined-reduced catalyst deactivating faster than the reduced-only catalysts. The catalysts were stable for the first hour but then deactivated with TOS. The initial methane conversion was quite high, 68-70% during 30-60 min TOS at 600° C., and the initial rate of 8.5 (mol of CH4/gNi h) and activation energy of about 92 [KJ/mol], are comparable with catalysts containing Pt—Ni alloys.

Carbon deposition takes place during the DRM reaction on Ni/fumed $SiO_2$ catalysts in the form of C-NT with the Ni crystallites atop of the C-NT, a well-known mechanism of C-NT formation. C-NT formation allows deposition of large amounts of carbon on the catalyst (up to 78%), with the reaction taking place on the interface of C-NT on the Ni crystallites atop the nanotubes. It was also found that C-NT form clumps of entangled C-NT that eventually encapsulate the Ni crystallites leading to catalyst deactivation. Similar C-NT structures form during methane decomposition (without $CO_2$), but at a much faster rate leading to complete deactivation in about 30 min. This shows the main source of carbon formation is methane, and indirectly to the conclusion that $CO_2$ slows down C-NT formation either reacting with carbon or by blocking sites for methane decomposition.

A novel method of catalyst preparation was discovered by diluting the impregnated catalysts with fumed $SiO_2$ support, then applying pressure, using a press, to the mixed powder to form a pellet, which is then broken into particles. The p-diluted catalysts exhibited higher dispersion that varies with the applied pressure, showing an optimal dispersion of 67% at 5000 psi. A transport mechanism of Ni $(NO_3)_2.6H_2O$ into the added silica was proposed to explain the increased dispersion. Because of their higher dispersion, p-diluted catalysts showed increased activity and stability than the best undiluted catalyst. The higher stability was due the formation of fewer C-NTs, located far from each other, resulting in decreased entanglement.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A method for the preparation of a reforming catalyst, the method comprising:
    a. depositing a metal precursor on a porous support by wet impregnation, wherein the porous support is selected from the group consisting of a fumed silica, a fumed metal oxide, and combinations thereof;
    b. drying the porous support after depositing the metal precursor to form a powder;
    c. adding additional porous support to the powder to form a diluted powder; and
    d. pressing the diluted powder to form pellets.

2. The method of claim 1, wherein the metal precursor comprises a metal, a metal oxide, a metal nitrate, a metal acetate, a metal chloride, a metal sulfate, or combinations thereof.

3. The method of claim 1, wherein the metal precursor comprises a transition metal, a noble metal, or combinations thereof.

4. The method of claim 1, wherein the metal precursor comprises a metal selected from the group consisting of nickel, platinum, copper, iron, cobalt, palladium, rhodium, and combinations thereof.

5. The method of claim 4, wherein the metal precursor comprises nickel.

6. The method of claim 5, wherein the metal precursor comprises a nickel oxide, a nickel nitrate, a nickel acetate, a nickel chloride, a nickel sulfate, or combinations thereof.

7. The method of claim 6, wherein the metal precursor comprises a nickel nitrate.

8. The method of claim 1, wherein the metal precursor is dissolved in water prior to depositing the metal precursor on the porous support by wet impregnation.

9. The method of claim 1, wherein the fumed metal oxide comprises a fumed alumina, a fumed titania, or combinations thereof.

10. The method of claim 1, wherein the additional porous support is added to the powder at a weight ratio ranging from 0.1:2 to 2:0.1.

11. The method of claim 1, wherein the diluted powder is pressed at about 2,000 psi to about 15,000 psi.

12. The method of claim 11, wherein the diluted powder is pressed at about 5,000 psi.

13. The method of claim 11, wherein the diluted powder is pressed at about 10,000 psi.

14. The method of claim 1, wherein the method further comprises reducing the pellets or particles.

15. A reforming catalyst prepared by the method of claim 1.

* * * * *